United States Patent
Bhattad et al.

(10) Patent No.: US 11,032,844 B2
(45) Date of Patent: Jun. 8, 2021

(54) PHYSICAL SHARED CHANNEL TRANSMISSION TO ACKNOWLEDGEMENT DELAY OPTIMIZATION

(71) Applicant: QUALCOMM Incorporated, San Diego, CA (US)

(72) Inventors: Kapil Bhattad, Bangalore (IN); Hao Xu, Beijing (CN); Alberto Rico Alvarino, San Diego, CA (US); Xiao Feng Wang, San Diego, CA (US); Peter Gaal, San Diego, CA (US); Nerrie Zohn, Coronado, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 16/000,624

(22) Filed: Jun. 5, 2018

(65) Prior Publication Data

US 2018/0376498 A1   Dec. 27, 2018

(30) Foreign Application Priority Data

Jun. 22, 2017 (IN) .............................. 201741021940

(51) Int. Cl.
*H04W 72/12*  (2009.01)
*H04L 5/00*  (2006.01)
(Continued)

(52) U.S. Cl.
CPC ....... *H04W 72/1294* (2013.01); *H04L 1/0003* (2013.01); *H04L 1/08* (2013.01);
(Continued)

(58) Field of Classification Search
CPC ... H04W 8/24; H04W 72/1294; H04W 76/11; H04W 36/14
See application file for complete search history.

(56) References Cited

U.S. PATENT DOCUMENTS

| 2004/0224697 | A1  | 11/2004 | Hakkinen et al. |
| 2008/0165697 | A1* | 7/2008 | Zeira ..................... H04L 1/1671 370/252 |

(Continued)

OTHER PUBLICATIONS

Huawei., et al., "Discussion on Timing Relations for NR Frame Structure", 3GPP Draft; R1-166105, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), XP051125216, 4 pages, Retrieved from the Internet: URL: http://www.3gpp.org/ftp/Meetings_3GPP_SYNC/RAN1/Docs/—[retrieved on Aug. 21, 2016].

(Continued)

*Primary Examiner* — Jael M Ulysse
(74) *Attorney, Agent, or Firm* — Holland & Hart LLP

(57) ABSTRACT

Methods, systems, and devices for wireless communication are described. A user equipment (UE) may receive data in a downlink transmission from a base station. After the UE successfully processes the data, the UE may select a transmit time interval (TTI) in which to send an acknowledgement (ACK) of the data to the base station. In some examples, the UE may select the TTI based on a delay that is a function of the processing abilities of the UE. Additionally or alternatively, the UE may select the TTI based on a delay that is a function of the transmission parameters of the downlink transmission. After selecting the TTI, the UE may send the ACK to the base station in the selected TTI.

40 Claims, 12 Drawing Sheets

(51) Int. Cl.
  *H04L 1/18* (2006.01)
  *H04L 1/00* (2006.01)
  *H04L 1/08* (2006.01)
  *H04W 72/04* (2009.01)
  *H04W 72/14* (2009.01)

(52) U.S. Cl.
  CPC .......... *H04L 1/1819* (2013.01); *H04L 1/1825* (2013.01); *H04L 1/1854* (2013.01); *H04L 1/1861* (2013.01); *H04L 1/1887* (2013.01); *H04L 5/0055* (2013.01); *H04L 5/0064* (2013.01); *H04L 5/0094* (2013.01); *H04W 72/1289* (2013.01); *H04L 1/0023* (2013.01); *H04L 1/1812* (2013.01); *H04W 72/0406* (2013.01); *H04W 72/14* (2013.01)

(56) References Cited

U.S. PATENT DOCUMENTS

| | | | | | |
|---|---|---|---|---|---|
| 2011/0129033 | A1* | 6/2011 | Dai | ............... | H04B 7/063 375/299 |
| 2011/0211522 | A1* | 9/2011 | Chung | ............... | H04L 1/1887 370/315 |
| 2012/0307648 | A1* | 12/2012 | Oku bo | ............... | H04W 72/06 370/241 |
| 2014/0362832 | A1* | 12/2014 | Rudolf | ............... | H04L 1/1887 370/336 |
| 2015/0124671 | A1* | 5/2015 | Tabet | ............... | H04L 1/1887 370/311 |
| 2015/0180621 | A1* | 6/2015 | Guan | ............... | H04L 5/0055 370/330 |
| 2015/0180622 | A1* | 6/2015 | Yoo | ............... | H04L 5/0076 370/330 |
| 2015/0229444 | A1* | 8/2015 | Webb | ............... | H04W 72/1278 370/329 |
| 2015/0282130 | A1* | 10/2015 | Webb | ............... | H04L 1/08 370/329 |
| 2015/0304080 | A1* | 10/2015 | Yl | ............... | H04W 72/044 370/329 |
| 2016/0095076 | A1* | 3/2016 | Xiong | ............... | H04W 56/002 370/336 |
| 2016/0105848 | A1* | 4/2016 | Li | ............... | H04L 1/08 370/329 |
| 2016/0112181 | A1* | 4/2016 | Tabet | ............... | H04W 72/0413 370/296 |
| 2016/0119948 | A1* | 4/2016 | Damnjanovic | ....... | H04L 5/0094 370/280 |
| 2016/0135194 | A1* | 5/2016 | Kim | ............... | H04L 1/0026 370/329 |
| 2016/0173262 | A1* | 6/2016 | Davydov | ............... | H04L 1/0075 370/329 |
| 2016/0360550 | A1 | 12/2016 | Chen et al. | | |
| 2017/0163387 | A1* | 6/2017 | Tabet | ............... | H04L 1/1887 |
| 2017/0238304 | A1* | 8/2017 | Ling | ............... | H04L 5/0037 370/336 |
| 2017/0339682 | A1* | 11/2017 | Lee | ............... | H04W 52/0216 |

OTHER PUBLICATIONS

Huawei et al., "Processing Time Reduction and Related Procedures for Short TTI", 3GPP Draft; R1-1611167, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 5, 2016, XP051189740, Retrieved from the Internet: URL:http://www.3gpp.org/ftp/tsg_ran/WG1_RL1/TSGR1_87/Docs/ [retrieved on Nov. 5, 2016], 8 pages.
International Search Report and Written Opinion—PCT/US2018/036314—ISA/EPO—dated Oct. 9, 2018.
Partial International Search Report—PCT/US2018/036314—ISA/EPO—dated Aug. 23, 2018.
European Search Report—EP20198537—Search Authority—The Hague—dated Nov. 9, 2020.

* cited by examiner

PHYSICAL SHARED CHANNEL TRANSMISSION TO ACKNOWLEDGEMENT DELAY OPTIMIZATION

CROSS REFERENCES

The present Application for Patent claims priority to India Provisional Patent Application No. 201741021940 by Bhattad, et al., entitled "Physical Shared Channel Transmission to Acknowledgement Delay Optimization," filed Jun. 22, 2017, which is assigned to the assignee hereof and expressly incorporated by reference herein.

BACKGROUND

The following relates generally to wireless communication, and more specifically to physical shared channel transmission to acknowledgement delay optimization.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a wireless system may increase the reliability of its communications by employing an error correction mechanism, such as hybrid automatic repeat request (HARQ). In HARQ, a UE that receives data from a base station may send an acknowledgement (ACK) or negative acknowledgment (NACK) to the base station indicating whether the data was successfully received and decoded (e.g., whether the received data passes an error detection check). If the data is successfully decoded, the UE may enter into a low power mode to save energy after responding with an ACK.

SUMMARY

A user equipment (UE) that receives a downlink data transmission may select a delay to use between receiving the downlink transmission and sending a corresponding acknowledgement (ACK) or negative acknowledgment (NACK). The duration of the delay may be variable rather than fixed, and may be a function of the UE's design and/or a function of the transmission parameters of the downlink transmission. In one example, the UE may determine a delay duration that corresponds to its ability to process downlink data and send its serving base station an indicator of the delay. The UE may then use the delay for ACK/NACK transmissions (e.g., until its processing capabilities change). Additionally or alternatively, the UE may select the delay based on transmission parameters of a downlink data transmission, such as the size of the transport block(s) used to convey the downlink data. For example, the UE may select the duration of the delay proportional to the size of the transport block size. The serving base station may perform a similar assessment to determine when to monitor for the ACK.

A method of wireless communication is described. The method may include receiving a downlink scheduling grant from a base station, the downlink scheduling grant indicating an upcoming downlink transmission from the base station, receiving the downlink transmission from the base station in a first transmission time interval (TTI), the downlink transmission associated with a transmission mode and comprising at least one transport block over at least one transmission layer, identifying a second TTI for sending an acknowledgement of data conveyed by the downlink transmission, wherein the second TTI is identified based at least in part on the first TTI and one or more transmission parameters associated with the at least one transport block, the at least one transmission layer, or the transmission mode, and sending an acknowledgement of the data to the base station during the second TTI.

An apparatus for wireless communication is described. The apparatus may include means for receiving a downlink scheduling grant from a base station, the downlink scheduling grant indicating an upcoming downlink transmission from the base station, means for receiving the downlink transmission from the base station in a first TTI, the downlink transmission associated with a transmission mode and comprising at least one transport block over at least one transmission layer, means for identifying a second TTI for sending an acknowledgement of data conveyed by the downlink transmission, wherein the second TTI is identified based at least in part on the first TTI and one or more transmission parameters associated with the at least one transport block, the at least one transmission layer, or the transmission mode, and means for sending an acknowledgement of the data to the base station during the second TTI.

Another apparatus for wireless communication is described. The apparatus may include a processor, memory in electronic communication with the processor, and instructions stored in the memory. The instructions may be operable to cause the processor to receive a downlink scheduling grant from a base station, the downlink scheduling grant indicating an upcoming downlink transmission from the base station, receive the downlink transmission from the base station in a first TTI, the downlink transmission associated with a transmission mode and comprising at least one transport block over at least one transmission layer, identify a second TTI for sending an acknowledgement of data conveyed by the downlink transmission, wherein the second TTI is identified based at least in part on the first TTI and one or more transmission parameters associated with the at least one transport block, the at least one transmission layer, or the transmission mode, and send an acknowledgement of the data to the base station during the second TTI.

A non-transitory computer readable medium for wireless communication is described. The non-transitory computer-readable medium may include instructions operable to cause a processor to receive a downlink scheduling grant from a base station, the downlink scheduling grant indicating an upcoming downlink transmission from the base station, receive the downlink transmission from the base station in a first TTI, the downlink transmission associated with a transmission mode and comprising at least one transport block over at least one transmission layer, identify a second TTI for sending an acknowledgement of data conveyed by the downlink transmission, wherein the second TTI is identified based at least in part on the first TTI and one or more transmission parameters associated with the at least one transport block, the at least one transmission layer, or the transmission mode, and send an acknowledgement of the data to the base station during the second TTI.

Some examples of the method, apparatus, and non-transitory computer-readable medium described above may further include processes, features, means, or instructions for selecting a delay between the first TTI and the second TTI based on at least one of a code type of the downlink transmission, a repetition level of the downlink transmission, a size of the at least one transport block, a number of transmission layers in the at least one transmission layer, the transmission mode, a MCS of the at least one transport block, a code rate, a redundancy version of the downlink transmission, a resource allocation size, a modulation format, a bandwidth, or a number of carriers, associated with the downlink transmission, or a combination thereof.

In some examples of the method, apparatus, and non-transitory computer-readable medium described above, the selected delay may be proportional to the size of the at least one transport block. In some examples of the method, apparatus, and non-transitory computer-readable medium described above, identifying the second TTI comprises selecting a delay between the first TTI and the second TTI based on a table, the table identifying different delays for different combinations of transmission parameters corresponding to the one or more transmission parameters associated with the at least one transport block, the at least one transmission layer, the transmission mode, an MCS of the at least one transport block, a code rate, a redundancy version, a resource allocation size, a modulation format, a bandwidth, or a number of carriers.

In some examples of the method, apparatus, and non-transitory computer-readable medium described above, the UE comprises a Narrowband Internet of Things (NB-IoT) device. In some examples of the method, apparatus, and non-transitory computer-readable medium described above, identifying the second TTI comprises identifying a plurality of TTIs during which the base station will be monitoring for the acknowledgement based on the one or more transmission parameters. Some examples of the method, apparatus, and non-transitory computer-readable medium described above may further include processes, features, means, or instructions for selecting the second TTI from the plurality of TTIs based on a UE capability to process downlink transmissions. The second TTI may include, for example a subset of the plurality of TTIs (e.g., multiple TTIs).

A method of wireless communication is described. The method may include identifying, by a UE, a capability of the UE to process transmissions, transmitting, to a base station, an indication of the UE's capability to process transmissions, receiving a first physical channel transmission from the base station in a first TTI, and communicating a second physical channel transmission with the base station in a second TTI, wherein the second TTI is determined based on the first TTI and the indicated capability of the UE to process transmissions.

An apparatus for wireless communication is described. The apparatus may include means for identifying, by a UE, a capability of the UE to process transmissions, means for transmitting, to a base station, an indication of the UE's capability to process transmissions, means for receiving a first physical channel transmission from the base station in a first TTI, and means for communicating a second physical channel transmission with the base station in a second TTI, wherein the second TTI is determined based on the first TTI and the indicated capability of the UE to process transmissions.

Another apparatus for wireless communication is described. The apparatus may include a processor, memory in electronic communication with the processor, and instructions stored in the memory. The instructions may be operable to cause the processor to identify, by a UE, a capability of the UE to process transmissions, transmit, to a base station, an indication of the UE's capability to process transmissions, receive a first physical channel transmission from the base station in a first TTI, and communicate a second physical channel transmission with the base station in a second TTI, wherein the second TTI is determined based on the first TTI and the indicated capability of the UE to process transmissions.

A non-transitory computer readable medium for wireless communication is described. The non-transitory computer-readable medium may include instructions operable to cause a processor to identify, by a UE, a capability of the UE to process transmissions, transmit, to a base station, an indication of the UE's capability to process transmissions, receive a first physical channel transmission from the base station in a first TTI, and communicate a second physical channel transmission with the base station in a second TTI, wherein the second TTI is determined based on the first TTI and the indicated capability of the UE to process transmissions.

In some examples of the method, apparatus, and non-transitory computer-readable medium described above, the first physical channel transmission comprises a physical downlink shared channel (PDSCH) transmission and communicating the second physical channel transmission comprises transmitting an acknowledgement (ACK) message for the PDSCH transmission. In some examples of the method, apparatus, and non-transitory computer-readable medium described above, the indication of the UE's capability to process transmissions indicates that the UE may be able to transmit the ACK message with a transmission delay that may be smaller than a default transmission delay for transmitting ACK messages. In some examples of the method, apparatus, and non-transitory computer-readable medium described above, the indication of the UE's capability to process transmissions comprises a maximum ACK delay value supported by the UE.

In some examples of the method, apparatus, and non-transitory computer-readable medium described above, the first physical channel transmission comprises a physical downlink control channel (PDCCH) transmission and communicating the second physical channel transmission comprises receiving a physical downlink shared channel (PDSCH) transmission. In some examples of the method, apparatus, and non-transitory computer-readable medium described above, the indication of the UE's capability to process downlink transmissions indicates a processing capability of the UE associated with one or more transport block sizes, a processing capability of the UE associated with a number of transmission layers, a processing capability of the UE associated with one or more transmission modes, or a combination thereof. In some examples of the method, apparatus, and non-transitory computer-readable medium described above, the first physical channel transmission comprises a physical downlink control channel (PDCCH) transmission and communicating the second physical channel transmission comprises transmitting a physical uplink shared channel (PUSCH) transmission. In some examples of the method, apparatus, and non-transitory computer-readable medium described above, the indication of the UE's capability to process transmissions indicates a capability of the UE to encode the PUSCH transmission.

Some examples of the method, apparatus, and non-transitory computer-readable medium described above may further include processes, features, means, or instructions for determining a change in the UE's capability to process transmissions. Some examples of the method, apparatus, and non-transitory computer-readable medium described above may further include processes, features, means, or instructions for transmitting, to the base station, a second indication of the UE's capability to process transmissions, the second indication reflecting the change in the UE's capability to process transmissions. In some examples of the method, apparatus, and non-transitory computer-readable medium described above, the UE comprises an NB-IoT device.

A method of wireless communication is described. The method may include receiving a scheduling grant at a user equipment (UE) from a base station in a first transmission time interval (TTI), the scheduling grant indicating resources for communicating a transmission with the base station, the transmission associated with a transmission mode and comprising at least one transport block over at least one transmission layer, identifying a second TTI for the transmission, wherein the second TTI is identified based at least in part on the first TTI and one or more transmission parameters associated with the at least one transport block, the at least one transmission layer, or the transmission mode, and communicating the transmission during the second TTI.

An apparatus for wireless communication is described. The apparatus may include means for receiving a scheduling grant at a user equipment (UE) from a base station in a first transmission time interval (TTI), the scheduling grant indicating resources for communicating a transmission with the base station, the transmission associated with a transmission mode and comprising at least one transport block over at least one transmission layer, means for identifying a second TTI for the transmission, wherein the second TTI is identified based at least in part on the first TTI and one or more transmission parameters associated with the at least one transport block, the at least one transmission layer, or the transmission mode, and means for communicating the transmission during the second TTI.

Another apparatus for wireless communication is described. The apparatus may include a processor, memory in electronic communication with the processor, and instructions stored in the memory. The instructions may be operable to cause the processor to receive a scheduling grant at a user equipment (UE) from a base station in a first transmission time interval (TTI), the scheduling grant indicating resources for communicating a transmission with the base station, the transmission associated with a transmission mode and comprising at least one transport block over at least one transmission layer, identify a second TTI for the transmission, wherein the second TTI is identified based at least in part on the first TTI and one or more transmission parameters associated with the at least one transport block, the at least one transmission layer, or the transmission mode, and communicate the transmission during the second TTI.

A non-transitory computer readable medium for wireless communication is described. The non-transitory computer-readable medium may include instructions operable to cause a processor to receive a scheduling grant at a user equipment (UE) from a base station in a first transmission time interval (TTI), the scheduling grant indicating resources for communicating a transmission with the base station, the transmission associated with a transmission mode and comprising at least one transport block over at least one transmission layer, identify a second TTI for the transmission, wherein the second TTI is identified based at least in part on the first TTI and one or more transmission parameters associated with the at least one transport block, the at least one transmission layer, or the transmission mode, and communicate the transmission during the second TTI.

Some examples of the method, apparatus, and non-transitory computer-readable medium described above may further include processes, features, means, or instructions for determining an ability by the UE to process scheduling grants, and indicating to the base station, a delay between the scheduling grants and corresponding transmissions based at least in part on the determined ability, wherein the identifying the second TTI is based at least in part on the indicated delay.

Some examples of the method, apparatus, and non-transitory computer-readable medium described above may further include processes, features, means, or instructions for selecting a delay between the received scheduling grant and the transmission based at least in part on a code type, a repetition level, a size of the at least one transport block, a modulation and coding scheme (MCS) of the at least one transport block, a number of transmission layers in the at least one transmission layer, or the transmission mode, a code rate, a redundancy version, a resource allocation size, a modulation format, a bandwidth, a number of carriers, associated with the transmission, or a physical downlink control channel (PDCCH) search space size, a number of PDCCH candidates, or a combination thereof, wherein the identifying the second TTI is based at least in part on the selected delay.

DETAILED DESCRIPTION

A user equipment (UE) may send an acknowledgment (ACK) or negative acknowledgement (NACK) to a base station after the UE receives a downlink data transmission sent in a physical downlink shared channel (PDSCH). In some cases, the UE may enter into a low power mode (e.g., sleep mode) after sending the ACK/NACK. In some cases, the UE may be operating according to a hybrid automatic repeat request (HARQ) protocol that operates according to a fixed duration of time (e.g., 12 ms) between received PDSCH transmissions and sending ACK/NACK. Because the transmission parameters associated with the downlink data transmission may vary (e.g., the transport block size, number of layers, repetition level coding type, etc.), the fixed duration of time may be designed to handle the worst case processing time for the data (e.g., the worst case processing time to decode the PDSCH and prepare for an uplink ACK/NACK transmission). The UE may be prevented from entering into the low power mode until it sends an ACK/NACK, which may increase the power expenditure of the UE. Additionally or alternatively, using a fixed delay to send ACKs/NACKs, regardless of a UE's capabilities, may prevent more powerful UEs from taking advantage of their faster processing capabilities. For instance, a UE supporting enhanced Machine Type Communications (eMTC) may be able to process an entire Narrow-Band Internet of Things (NB-IoT) PDSCH in a subframe (e.g., in 1 ms), but a low cost UE specifically designed for NB-IoT may require more subframes. Using the same delay for both UEs may prevent the more powerful UE from entering into low power mode earlier or more efficiently communicating data.

According to the techniques described herein, a UE may select a delay that corresponds to its ability to process downlink data. For example, a UE may select a delay that allows the UE to enter into a low power mode shortly after it finishes processing a downlink transmission. The UE may select the delay based on the processing capabilities of the UE (which may be a function of the UE's design) and/or based on the transmission parameters of the downlink data transmission (e.g., the UE may select a delay based on the transport block size of the downlink transmission). By tailoring the delay to the UE's ability to process the downlink data, the UE may spend more time in low power mode and increase its power savings. Additionally or alternatively, the UE may spend more time sending or receiving other signals, which may increase throughput.

Figure 1:
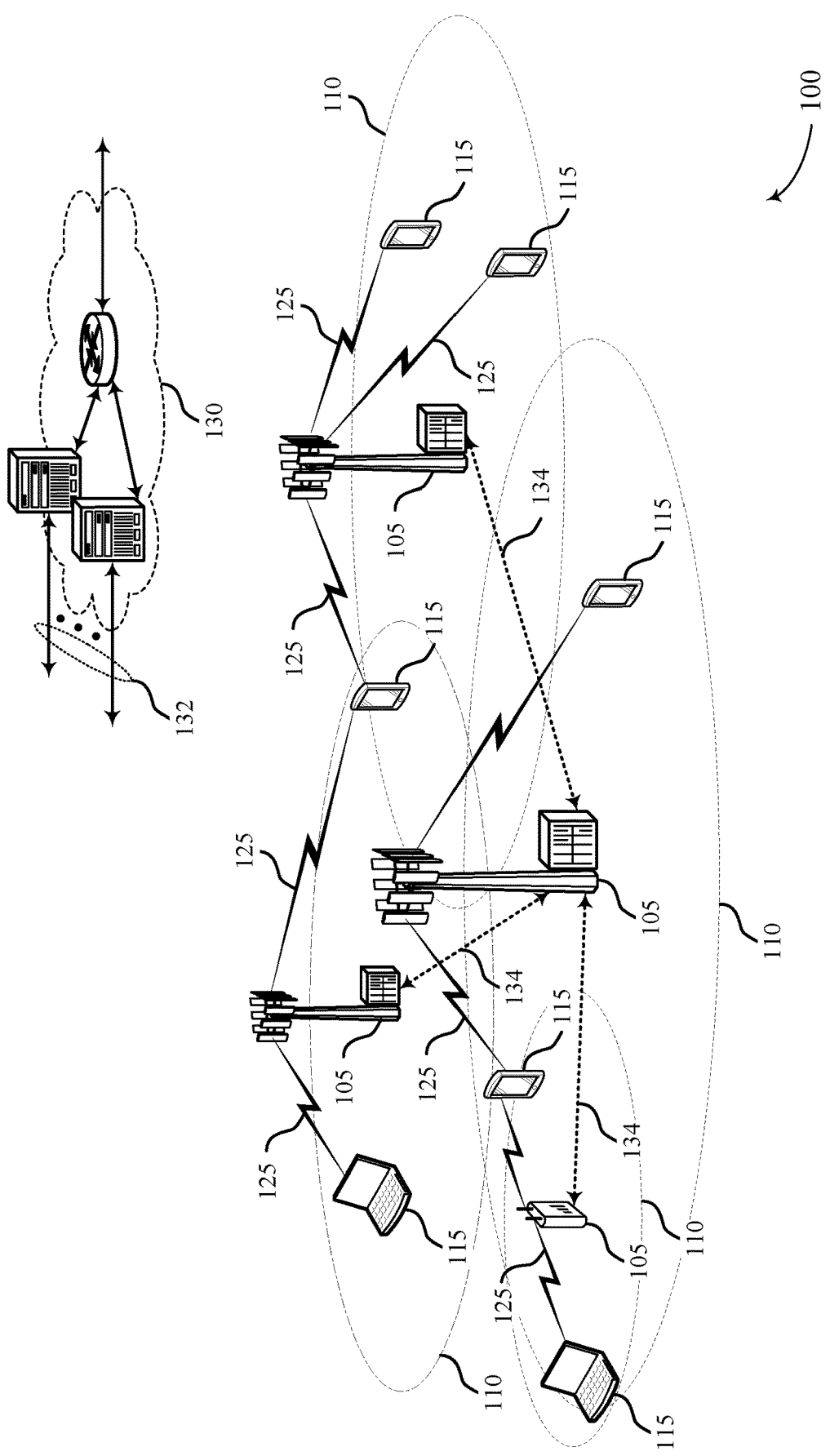
FIG. 1 illustrates an example of a system for wireless communication that supports physical shared channel transmission to acknowledgement delay optimization in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. According to the techniques described herein, a UE 115 may recognize when there is an opportunity for the UE 115 to reduce delays in an error correction scheme and may adjust its communications to effectuate that reduction.

In one example, a UE 115 and a base station 105 may participate in hybrid automatic repeat request (HARQ) processes that increase the reliability of communications between the UE 115 and the base station 105. In HARQ, control messages are transmitted by a UE 115 to indicate the receipt status of data sent by a base station 105. If the UE 115 cannot successfully process the data, the UE 115 may send a negative acknowledgement (NACK) to the base station 105. The NACK may prompt the base station 105 to resend the data so that the UE 115 successfully process it. If the UE 115 successfully receives the data, the UE 115 may send an acknowledgement (ACK) to the base station 105. The ACK may inform the base station 105 that the data was successfully processed and does not need to be resent. In some cases, HARQ processes may be supplemented by increasing the repetition level of the data. For example, multiple (e.g., redundant) versions of the data may be sent (e.g., in back-to-back subframe) so that the UE 115 has a greater likelihood of successfully processing the data (e.g., by combining the different versions of the data).

In some cases, there may be a fixed delay in between receiving data and sending an ACK or NACK (e.g., a PDSCH-to-ACK/NACK delay). For example, a HARQ process may operate according to a fixed delay between PDSCH and ACK/NACK. The amount of time may be designed to cover the worst-case processing time for the data across varying transmissions and UE capabilities. A UE 115 with higher processing capabilities may, after finishing processing of data transmissions, have to wait for the fixed delay to elapse. Waiting for the fixed delay to expire may prevent the UE 115 from entering into a low power mode, which may increase the power expenditure of the UE 115. Additionally or alternatively, waiting for the fixed delay to expire may prevent the UE 115 from engaging in other communications, which may reduce the throughput of the UE 115.

According to the techniques described herein, a UE 115 may operate according to a HARQ process with an adjustable PDSCH-to-ACK/NACK delay. The delay selected by the UE 115 may take into account the UE-specific processing time for a downlink transmission. For example, the UE 115 may select a delay that corresponds to how fast the UE 115 can process the data and prepare the ACK or NACK for transmission. The downlink processing abilities of the UE 115 may be factored into the delay (e.g., the UE 115 may select a capability-dependent delay), and/or the transmission parameters associated with the data may be factored into the delay (e.g., the UE 115 may select a transmission-dependent delay). However, the delay may be independent of the type of UE 115, and/or type of communications in which the UE 115 is engaging. Thus, the delays used by two UEs 115 may differ, even if the UEs 115 are of the same type (e.g., both NB-IoT UEs) and are participating in the same type of communications.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

In some examples, the base stations 105 and UEs 115 may communicate using narrowband internet of things (NB-IoT) technology. NB-IoT technology may operate over a frequency band having a defined bandwidth, and the frequency band may correspond to one resource block in LTE transmission (e.g., 180 kHz bandwidth). NB-IoT technology supports three modes of operation: stand-alone operation, guard band operation, and in-band operation. In stand-alone operation, frequencies are defined in which the base station 105-a and UE 115-a may communicate. In guard band operation, the base station 105-a and UE 115-a may communicate using unused resource blocks within a guard-band of a cellular carrier (e.g., LTE carrier). In in-band operation, the base station 105-a and UE 115-a may communicate using resource blocks within a cellular carrier (e.g., an LTE carrier). The examples provided herein may be used in any of these modes.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like. In some instances, a UE 115 may be a NB-IoT device with limited processing capabilities and/or battery life.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe (e.g., a slot or one or more symbols) or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
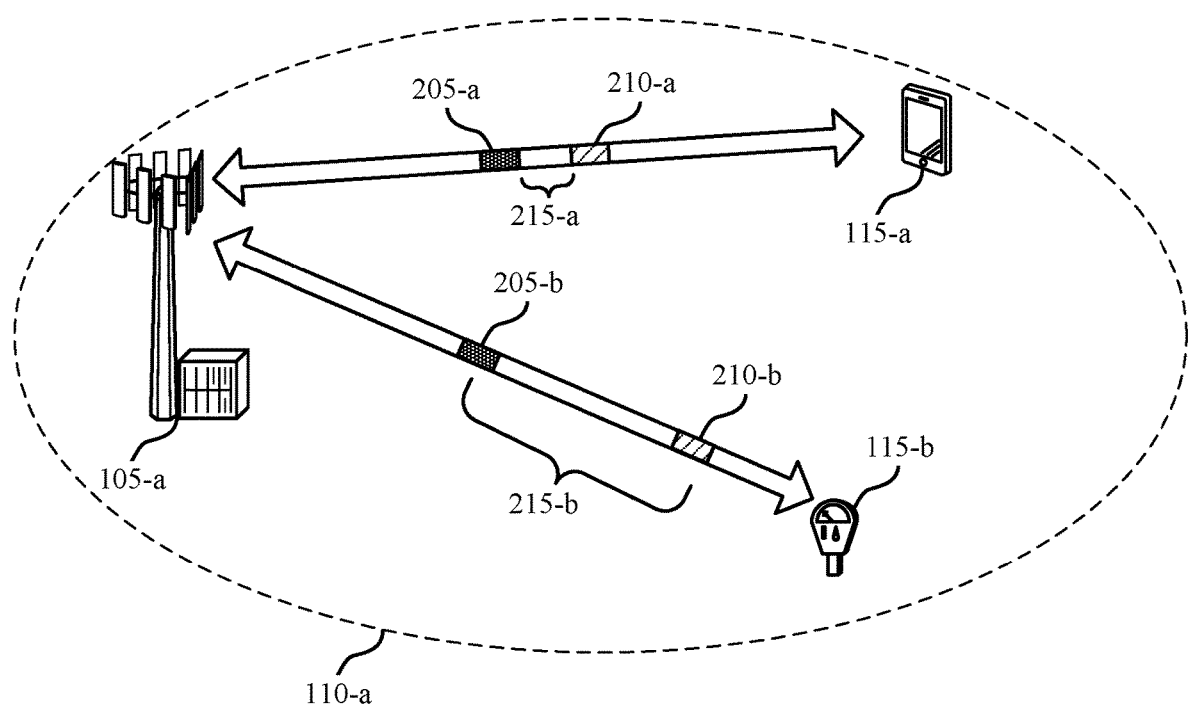
FIG. 2 illustrates an example of a wireless communications system that supports physical shared channel transmission to acknowledgement delay optimization in accordance with aspects of the present disclosure.

FIG. 2 illustrates an example of a wireless communications system 200 that supports physical shared channel transmission to acknowledgement delay optimization in accordance with various aspects of the present disclosure. In some examples, wireless communications system 200 may implement aspects of wireless communications system 100. Wireless communications system 200 may include base station 105-*a*, UE 115-*a*, and UE 115-*b*. UE 115-*b* may be an NB-IoT device with limited processing capabilities and battery life compared to UE 115-*a*.

Base station 105-*a* may communicate with devices inside its coverage area 110-*a*, such as UE 115-*a* and UE 115-*b*. For example, base station 105-*a* may send downlink data to UE 115-*a* using physical downlink shared channel (PDSCH) 205-*a*. Base station 105-*a* may also send downlink data to UE 115-*b* using PDSCH 205-*b*. PDSCH 205-*b* may be a narrowband PDSCH (nPDSCH). UE 115-*a* and UE 115-*b* may send an ACK to base station 105-*a* if they correctly receive the downlink data, or a NACK to base station 105-*a* if they incorrectly receive the downlink data. For example, UE 115-*a* may send ACK/NACK 210-*a* to base station 105-*a* and UE 115-*b* may send ACK/NACK 210-*b* to base station 105-*a*. Rather than sending the ACK/NACKs 210 according to a fixed delay, however, the UEs 115 may send the ACK/NACKs 210 according to a delay that is tailored to their ability to process the downlink data. The ability of a UE 115 to process downlink data may be based on the UE's design and/or the transmission parameters of the downlink data. Thus, a UE 115 may send an ACK/NACK according to a delay that is based on the UE's downlink processing abilities and/or based on the transmission parameters of the downlink data.

In one example, the ACK/NACK delay 215 used by the UEs 115 may accommodate their respective processing abilities and may be independent of the transmission parameters of the downlink data. For instance, UE 115-*a* and base station 105-*a* may determine that UE 115-*a* can process downlink data and prepare an ACK/NACK in a given amount of time (e.g., n ms, n symbols, or n TTIs). Accordingly, UE 115-*a* may use a delay 215-*a* that corresponds to n ms, n symbols, or n TTIs. Similarly, base station 105-*a* may monitor for ACK/NACKs from UE 115-*a* based on a delay that corresponds to n ms, n symbols, or n TTIs (e.g., within the first TTI that starts no earlier than the delay from the PDSCH). Due to the more limited processing capabilities of UE 115-*b*, UE 115-*b* may use a delay 215-*b* that corresponds to m ms, m symbols, or m TTIs, where m is greater than n.

In another example, the UEs 115 may select delay 215 based on the transmission parameters associated with the downlink data. For example, the UEs 115 may base the durations of the delays 215 on the size of the transport block(s) (TB) used to convey the downlink data in the PDSCH 205. Because larger transport blocks take longer to process, larger TB sizes may correspond to longer delays 215. The size of a transport block may be based on the number of bits conveyed by the transport block, which can be determined from the modulation and coding scheme (MCS) of the transport block and its resource allocation (e.g., how many resource blocks are assigned to the transport block). Thus, a delay 215 may be based on the MCS and/or resource allocation associated with downlink data.

In some cases, the UEs 115 may select the delays 215 based on other transmission parameters, such as the code type applied to the data (e.g., Turbo code, convolution code, low-density parity check (LDPC) code, polar code etc.), the repetition level of the data, a type of HARQ retransmission combining (e.g., chase combining or incremental redundancy combining), a redundancy version (e.g., initial transmission or retransmission), the number of layers used to convey the data, or a modulation format of the data. In some examples, a delay 215 is a function of the repetition level (e.g., longer delays for higher repetition levels). A delay 215 may also be based on whether the redundant versions of the data are combined before or after decoding (e.g., combining demapped codeword symbols or decoded soft bits). In some examples, a delay 215 is a function of the number of layers associated with the PDSCH (e.g., longer delays for more layers). Additionally or alternatively, a delay 215 may be a function of the transmission mode (e.g., transmit diversity, spatial multiplexing, different pilot pattern/pilot type schemes). For example, in some transmission modes (e.g., TM1, TM2), processing for at least some data symbols can begin right after the end of the data symbols whereas in other transmission modes (e.g., TM9), processing may be delayed until after a subframe because of, for example, the locations of reference signals within the subframe. Thus, shorter delays may be used for some transmission modes (e.g., TM1, TM2) and longer delays may be used for other transmission modes (e.g., TM9).

In some examples, a UE 115 and base station 105 may reference a table to determine a delay 215. The table may identify different delay durations for different combinations of transmission parameters. For instance, the table may identify a delay duration of y ms when the downlink data is applied with Turbo code, has a repetition level of two, and is transmitted using TM 9. In some cases, the transmission parameters may serve as an index for the table. Other parameters that can serve as an index for the table include the type of UE 115 (e.g., whether the UE 115 is an eMTC device, an NB-IoT device, an LTE device, etc.). Thus, a UE 115 may determine the relevant transmission parameters for a downlink data transmission and use them to select a delay duration from the table. In some examples, a table indexed by parameters such as type of code, repetition level, HARQ combining type, number of layers, and/or TM provides a factor that is applied to a delay determined by TB size. The resulting delay may be rounded up to provide the delay in ms, symbols, or TTIs, for example.

In some examples, a UE 115 may indicate to base station 105-*a* that the UE 115 will use a particular delay 215 indefinitely (e.g., until the UE 115 sends an update changing the delay 215). In other cases, the UE 115 may inform base station 105-*a* about the UE's processing capabilities so that the base station 105-*a* can determine when to expect, or monitor for, an ACK/NACK from the UE 115. The processing capabilities of the UE 115 may change, for example, when the battery power of the UE 115 changes, when the applications running on the UE 115 change, or when the UE 115 is participating in other concurrent communications.

Figure 3:
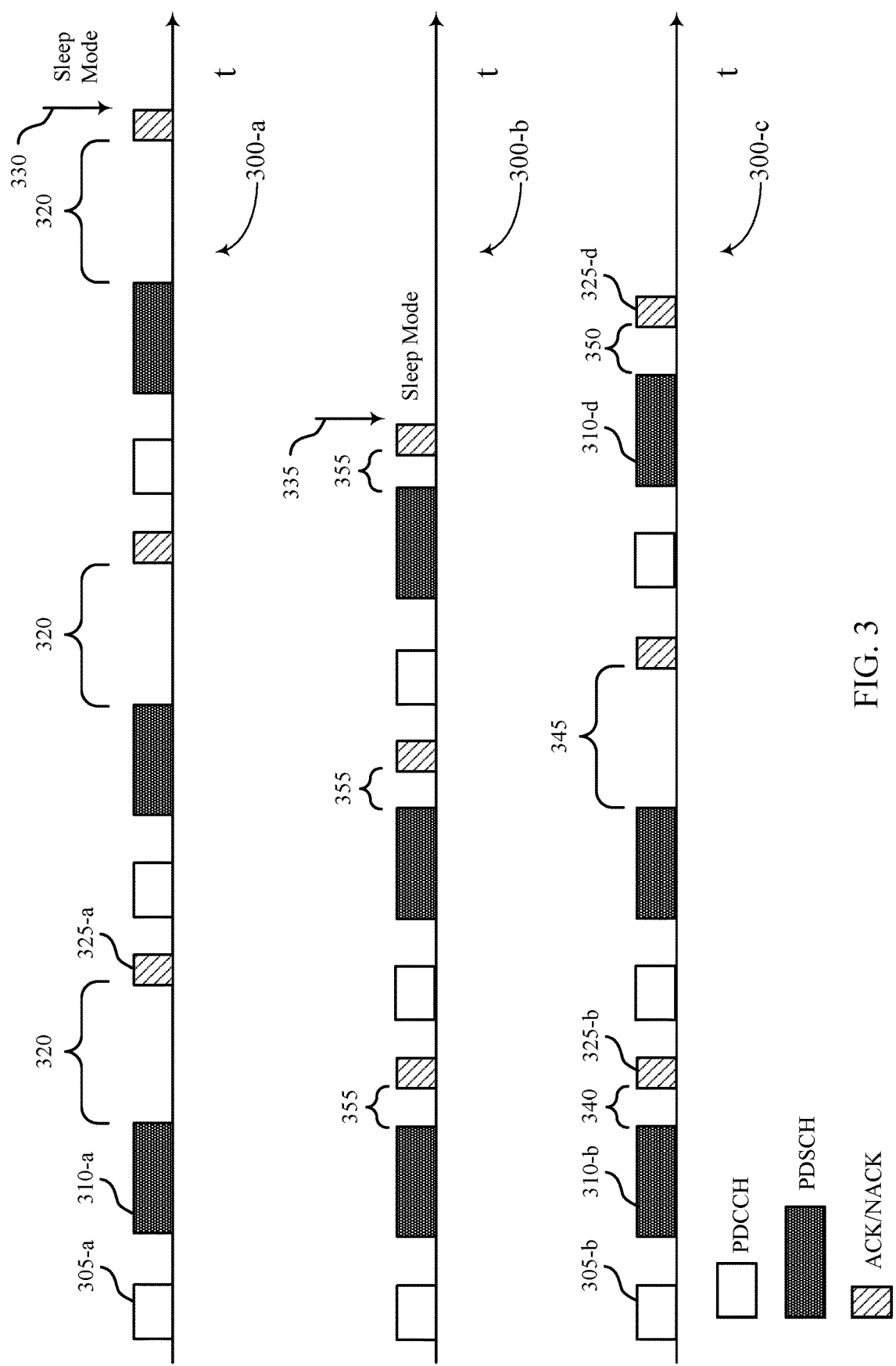
FIG. 3 illustrates examples of HARQ processes that support physical shared channel transmission to acknowledgement delay optimization in accordance with aspects of the present disclosure.

FIG. 3 illustrates an example of HARQ process 300 that support physical shared channel transmission to acknowledgement delay optimization in accordance with various aspects of the present disclosure. In some examples, HARQ processes 300 may be implemented by wireless communications system 100. HARQ processes 300 may be examples of communications between a base station 105 and a UE 115 as described with reference to FIG. 1. HARQ processes 300 can be used for communications in LTE, NR, eMTC, NB-IoT, etc. HARQ processes 300 may include physical downlink control channel (PDCCHs) transmissions 305, PDSCH transmissions 310, and ACK/NACKs 325.

A base station 105 with data for a UE 115 may schedule a downlink transmission to the UE 115 using a PDCCH transmission 305. For example, the base station 105 may schedule the data in three PDSCH transmissions 310. The PDCCH transmission 305 may indicate to the UE 115 that one or more upcoming PDSCH transmissions 310 include data for the UE 115 and may inform the UE 115 where to find (e.g., in time and frequency) that data in the PDSCH transmissions 310. For example, PDCCH transmission 305-a may indicate to the UE 115 that PDSCH transmission 310-a includes data for the UE 115 in certain specified time/frequency resources. A PDCCH transmission 305 may also include information about transmission parameters associated with the data. For example, a PDCCH transmission 305 may indicate the MCS and resource blocks assigned to the data, the level of repetition, the number of layers, the transmission mode, and/or the code type associated with the data.

After receiving a PDSCH transmission 310, the UE 115 may send an ACK/NACK 325 (e.g., ACK/NACK 325-a) to the base station 105 (e.g., the UE 115 may send an ACK if the UE 115 is able to successfully process the data and a NACK if the UE 115 is unable to successfully process the data). In some cases, the UE 115 may send the ACK/NACK 325 after a fixed delay 320 (e.g., a default delay of 12 ms for NB-IoT devices). For example, in HARQ process 300-a, the UE 115 may send each ACK/NACK 325 according to fixed delay 320, regardless of the processing capabilities of the UE 115 and irrespective of the transmission parameters associated with the PDSCH transmission 310. When a fixed delay 320 is used, the UE 115 may not enter low power mode (e.g., sleep mode or idle mode) until time 330.

According to the techniques described herein, a UE 115 may employ adaptable ACK/NACK delays. Adaptable ACK/NACK delays may enable the UE to spend more time in low power mode or increase efficiency of communications. For example, a UE 115 may employ HARQ process 300-b, in which the delay 355 is less than the fixed delay 320. By reducing the duration of delay 355, relative to delay 320, the UE 115 may enter sleep mode at 335, rather than at 330. The UE 115 may select the delay 355 based on the processing capabilities of the UE 115 and the delay 355 may be the same for multiple ACK/NACKs 325. For example, the UE 115 may determine that it can process downlink data and prepare a corresponding ACK/NACK 325 within n ms, n symbols, or n TTIs, regardless of the transmission parameters of the PDSCH transmission 310. The UE 115 may select a delay 355 to be used indefinitely based on the processing capabilities of the UE 115 (e.g., based on the n ms n symbols, or n TTIs). The UE 115 may send an indication of the delay 355 to the base station 105, which can leverage that information to determine when to monitor for ACK/NACKs 325. In some cases, the processing capabilities of the UE 115 may change over time (e.g., the processing capabilities may fluctuate with battery power or based on other enabled features or concurrent communications). To accommodate such changes, the UE 115 may re-evaluate its processing capabilities and send an update to the base station 105 indicating the changes. The UE 115 may also update the duration of its delay 355 and inform the base station 105 of this update.

In some cases, as shown in HARQ process 300-c, a UE 115 may select different delays for different PDSCH transmissions 310. The delays may be selected based on the transmission parameters of the data for each corresponding PDSCH transmission 310. For example, if the data in PDSCH transmission 310-b is conveyed in a small transport block, the UE 115 may select a shorter delay 340 (compared to the default delay 320) for sending the corresponding ACK/NACK 325-b. The UE 115 may determine the transport block size based on the MCS and resource allocation conveyed in PDCCH transmission 305-b. Conversely, if PDSCH transmission 310-c includes a large transport block, the UE 115 may select a longer delay 345 for sending the corresponding ACK/NACK 325-c. UE 115 may revert to using a shorter delay (e.g., delay 350) for a subsequent ACK/NACK (e.g., ACK/NACK 325-d) if the PDSCH transmission 310-d includes a small transport block. Thus, a UE 115 may dynamically select different delays for sending ACK/NACKs 325.

In some cases, the techniques described herein may be translated to the delays between PDCCH transmissions 305 and PDSCH transmissions 310 or physical uplink shared channel (PUSCH) transmissions. The delays may be configurable based on various parameters (e.g., a code type, a repetition level, a size of at least one transport block, a number of transmission layers, the transmission mode, MCS of the transport block, a code rate, a redundancy version of the transmission, a resource allocation size, a modulation format, a bandwidth, a number of carriers, etc.). For instance, the delay between a PDCCH transmission 305 and a PDSCH transmission 310 may be configurable based on the processing capabilities of the UE 115 or on the PDCCH search space (e.g., longer delays may be selected for larger search spaces or larger numbers of PDCCH candidates and shorter delays may be selected for smaller search spaces or smaller numbers of PDCCH candidates). In one example, the UE 115 may determine its ability to process a PDCCH transmission 305. Based on its ability, UE 115 may select a delay duration that a base station 105 should use between PDCCH transmissions 305 and PDSCH transmissions 310. For example, a default delay for PDCCH to PDSCH delay for NB-IoT communications may be 4 ms, but a UE capable of eMTC communications may be able to support a delay of 2 ms. Thus, the UE 115 may indicate to the base station 105 that it can support a 2 ms delay for PDCCH to PDSCH delay. Alternatively, the UE 115 may send its processing capabilities to the base station 105 and the base station 105 may select a PDCCH-to-PDSCH delay that accommodates the processing capabilities of the UE 115.

The delay between a PDCCH transmission and a PUSCH transmission may be configurable based on the processing capabilities of the UE 115, on the PDCCH search space size, on the number of PDCCH candidates, on transmission parameters (e.g., TB size, code type, code rate, repetition level, number of layers, redundancy version, MCS, resource allocation, transmission mode, carrier bandwidth, number of carriers, etc.), or on a combination of these factors. For example, the UE 115 may send a message to the base station 105 indicating a processing capability for the PDCCH search space or PUSCH encoding, and the base station 105 and UE 115 may each determine the PDCCH to PUSCH delay based on the processing capability, the PDCCH search space size, number of PDCCH candidates, and/or transmission parameters associated with the PUSCH transmission. For example, the UE 115 may determine that it can process uplink data and prepare a corresponding PUSCH within n ms, n symbols, or n TTIs, regardless of the transmission parameters of the PUSCH transmission. The UE 115 may select a delay to be used indefinitely based on the processing capabilities of the UE 115 (e.g., based on the n ms n symbols, or n TTIs). The UE 115 may send an indication of the delay to the base station 105, which can leverage that information to determine when to monitor for the PUSCH transmission. In some cases, the processing capabilities of the UE 115 may change over time (e.g., the processing capabilities may fluctuate with battery power or based on other enabled features or concurrent communications). To accommodate such changes, the UE 115 may re-evaluate its processing capabilities and send an update to the base station 105 indicating the changes. The UE 115 may also update the duration of its delay and inform the base station 105 of this update.

Additionally or alternatively, the timing between an uplink transmission such as an ACK/NACK or PUSCH transmission and a subsequent PDCCH from the base station may be adaptable based on UE capabilities. For example, a guard period of 1 ms may be used for retuning (e.g., for a half-duplex UE). Some UEs (e.g., UEs capable of full-duplex communications) may not require a guard period, and some UEs may be able to retune with a shorter delay (e.g., within a few symbols). Where the PDCCH starts after the start of the subframe, the UEs may be able to receive PDCCH in a subframe immediately following a subframe where the UE transmitted ACK/NACK or PUSCH. The UE may indicate its capabilities related to uplink transmission such as an ACK/NACK or PUSCH transmission and subsequent PDCCH transmission to the base station 105. Additionally or alternatively, the timing between an uplink transmission such as an ACK/NACK or PUSCH transmission and a subsequent PDCCH may depend on transmission parameters associated with the PUSCH transmission. For example, a UE may be unable to maintain other processing threads when a subsequent PDCCH directly or quickly follows a PUSCH or ACK/NACK. Thus, the UE 115 may report a capability for ACK/NACK or PUSCH transmission to PDCCH timing to allow for sharing of processing capabilities with other threads maintained by the UE. The ACK/NACK or PUSCH transmission to PDCCH timing may also be based on the PUSCH transmission parameters, as discussed above for PDCCH to PUSCH timing.

Figure 4:
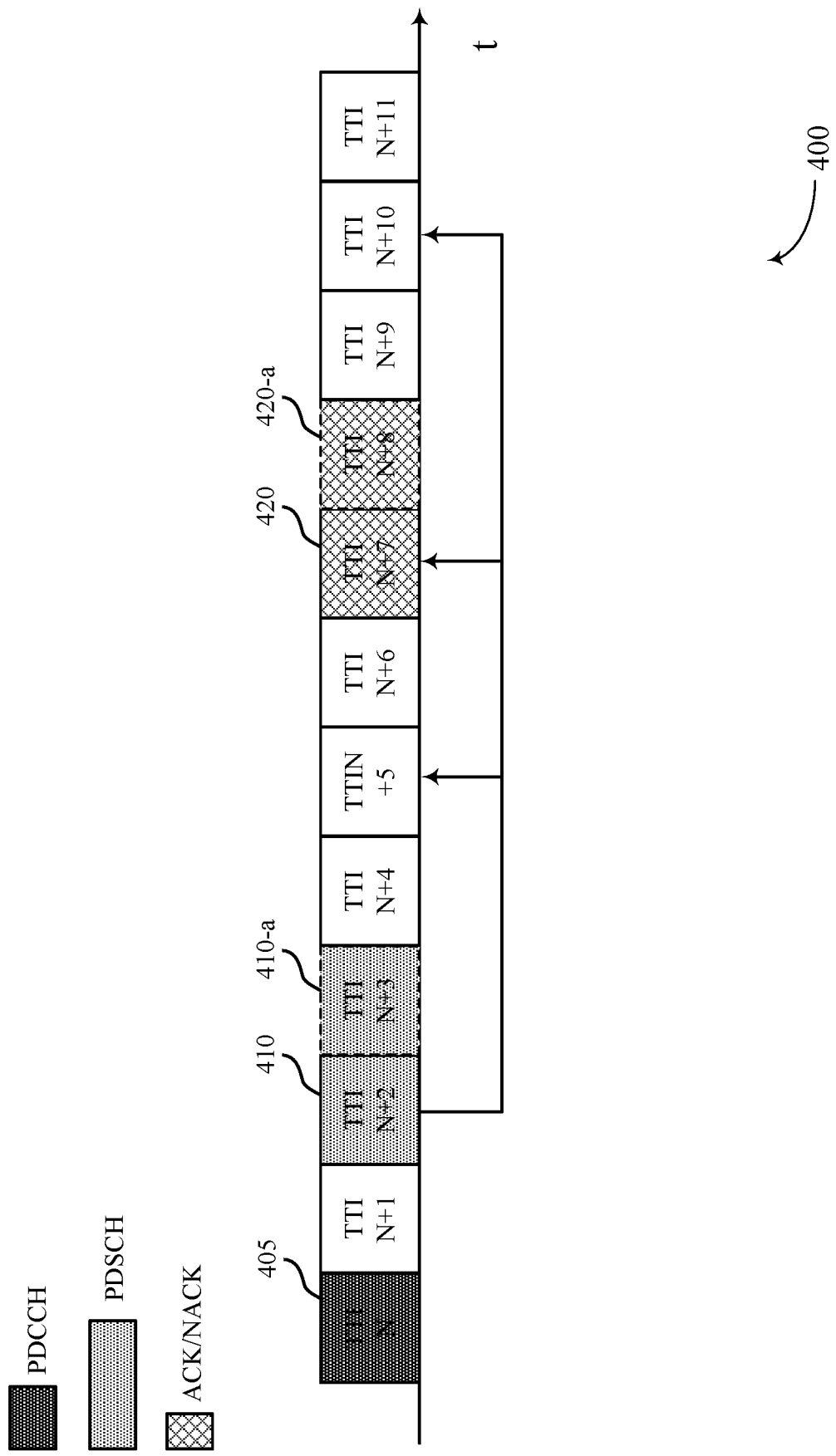
FIG. 4 illustrates an example of a HARQ process that supports physical shared channel transmission to acknowledgement delay optimization in accordance with aspects of the present disclosure.

FIG. 4 illustrates an example of a HARQ process 400 that supports physical shared channel transmission to acknowledgement delay optimization in accordance with various aspects of the present disclosure. HARQ process 400 may be implemented by a UE 115 and base station 105. HARQ process may include a PDCCH transmission 405, PDSCH transmission(s) 410, and ACK/NACK transmission(s) 420.

A base station 105 may send a PDCCH transmission 405 to a UE 115. The PDCCH transmission 405 may be sent in a TTI (e.g., TTI N). The PDCCH transmission 405 may indicate an upcoming PDSCH transmission 410 for the UE 115 and/or the transmission parameters for that PDSCH transmission 410. For example, the PDCCH transmission 405 may indicate that the upcoming PDSCH transmission 410 is in TTI N+2. The PDCCH transmission 405 may indicate the number of layers and/or code type used for the PDSCH transmission 410. Additionally or alternatively, the PDCCH transmission 405 may indicate the MCS and/or resource allocation for the PDSCH transmission 410. In some examples, the UE 115 may determine the transmission mode of the PDSCH transmission 410 (e.g., the UE 115 may be configured to operate in a TM via RRC signaling).

The UE 115 may receive the PDCCH transmission 405 in TTI N and determine which resources of the PDSCH transmission 410 convey data for the UE 115. The UE 115 may also determine the transmission parameters for the PDSCH transmission 410. Although PDCCH transmission 405 and PDSCH transmission 410 are shown in different TTIs, in some cases PDCCH transmission 405 and PDSCH transmission 410 may be transmitted/received in the same TTI. After receiving the PDSCH transmission 410 in TTI N+2, the UE 115 may send an ACK/NACK 420 to the base station 105 in TTI(s) selected by the UE 115. The UE 115 may select the TTI(s) from multiple TTIs that it knows the base station 105 will monitor. For example, the base station 105 may monitor for the ACK/NACK 420 in a first TTI associated with a first delay (e.g., 3 TTIs after TTI N+2), a second TTI associated with a second delay (e.g., 5 TTIs after TTI N+2), and a third TTI associated with a third delay (e.g., 8 TTIs after TTI N+2). The UE may select a subset of the monitored TTIs for transmission (e.g., repetitions) of ACK/NACK 420. The base station 105 and UE 115 may determine the opportunities (e.g., TTIs) for ACK/NACK signaling based on the transmission parameters of the downlink transmission as discussed above. For example, each of the first, second, and third delays may be based on UE capability and/or transmission parameters such as TB size, type of code, repetition level, HARQ combining type, number of layers, and/or TM. Thus, the UE 115 may have several opportunities (e.g., TTIs) to transmit the ACK/NACK 420, each of which is associated with a different delay. For example, TTI N+5 may be associated with a short delay (e.g., 3 TTIs), TTI N+7 may be associated with a medium delay (e.g., 5 TTIs), and TTI N+10 may be associated with a long delay (e.g., 8 TTIs). Based on the actual processing time (e.g., completion of decoding and error checking, etc.), the UE 115 may select one or more of the available TTIs monitored by the base station 105 for ACK/NACK 420. In some examples, UE 115 may reference a table to select the opportunities for ACK/NACK 420 (e.g., the table may define different delays for different combinations of transmission parameters as discussed above).

In some examples, the PDSCH transmission 410 may be associated with a repetition level (e.g., communicated via the PDCCH transmission 405 or semi-statically for each PDSCH transmission via RRC). For example, the PDCCH transmission 405 may indicate that data in PDSCH transmission 410 will be sent twice: once in PDSCH transmission 410 (e.g., once in TTI N+2) and again in PDSCH transmission 410-*a* (e.g., in a subsequent TTI). The UE 115 may combine the signals from both PDSCH transmissions 410 to increase the likelihood of successfully recovering the data conveyed by the PDSCH transmissions 410. The UE 115 may combine the signals prior to or after decoding (e.g., combining demapped symbols or soft bits). In some cases, the UE 115 may select the PDSCH-to-ACK/NACK delay based on whether the UE 115 combines the signals prior to decoding or after decoding.

When multiple PDSCH transmissions 410 are transmitted with redundant versions of data, the UE 115 may send a single ACK/NACK 420 to indicate the receipt status of one or both PDSCH transmissions 410. For instance, the UE 115 may send ACK/NACK 420 in TTI N+7 to indicate the receipt status of PDSCH transmission 410 and/or PDSCH transmission 410-*a* and the UE 115 may repeat ACK/NACK 420 in TTI N+8 as shown by ACK/NACK 420-*a*. The delay between the PDSCH transmission 410 and ACK/NACK 420 may be selected based on the repetition level of the data conveyed by the PDSCH transmissions 410.

Figure 5:
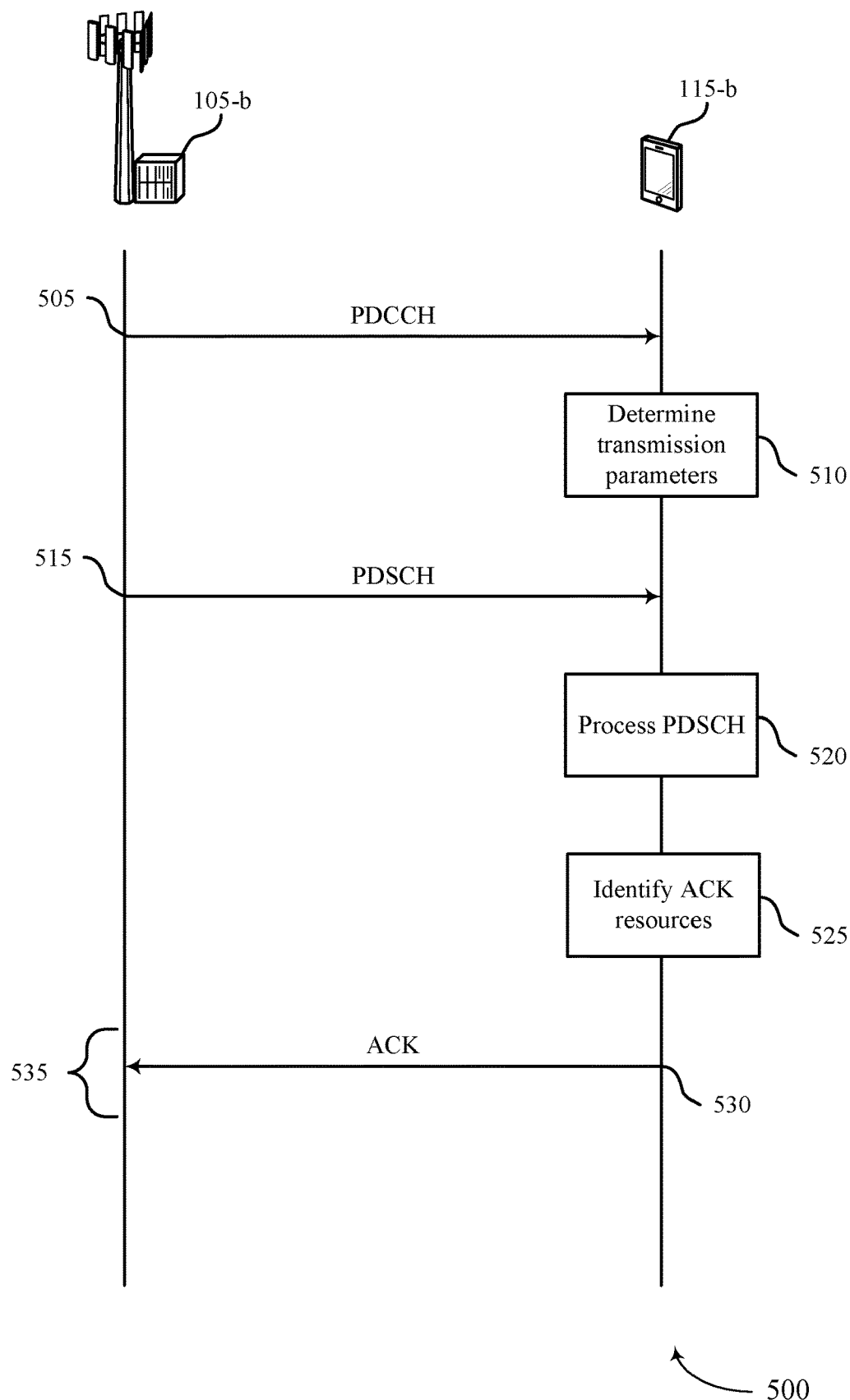
FIG. 5 illustrates an example of a process flow that supports physical shared channel transmission to acknowledgement delay optimization in accordance with aspects of the present disclosure.

FIG. 5 illustrates an example of a process flow 500 that supports physical shared channel transmission to acknowledgement delay optimization in accordance with various aspects of the present disclosure. In some examples, aspects of process flow 500 may be implemented by wireless communications system 100. Process flow 500 may involve base station 105-*b* and UE 115-*b*. In some cases, UE 115-*b* may be an NB-IoT device. Aspects of process flow 500 may be used to select a PDSCH-to-ACK delay that is based on the transmission parameters associated with a PDSCH. Prior to 505, UE 115-*b* may establish a connection with base station 105-*b* and monitor control channels associated with the base station 105-*b*. Although described with reference to PDSCH-to-ACK delay, aspects of process flow 500 may be used for PDSCH-to-NACK delay.

At 505, base station 105-*b* may send, and UE 115-*b* may receive, a downlink scheduling grant. The scheduling grant may indicate an upcoming downlink transmission that includes data for UE 115-*b* from base station 105-*b* (e.g., the scheduling grant may be a PDCCH transmission and may indicate an upcoming PDSCH transmission). In some cases, the scheduling grant may also include transmission parameters for the upcoming downlink transmission (e.g., repetition level, number of layer, MCS, resource allocation, redundancy version, transmission mode, code type, code rate, etc.). At 510, UE 115-*b* may determine the transmission parameters for the downlink transmission and/or the data. The transmission parameters may be received directly from base station 105-*b* and/or determined based on the transmission parameters sent from base station 105-*b* (e.g., UE 115-*b* may identify the size of the transport block(s) used to convey the data based on the MCS and resource allocation indicated in the scheduling grant). UE 115-*b* may also determine the time and frequency resources used to convey the data.

At 515, base station 105-*b* may send, and UE 115-*b* may receive, a downlink data transmission. For instance, base station 105-*b* may send data to UE 115-*b* in PDSCH (e.g., in a first TTI). At 520, UE 115-*b* may process the data in the downlink transmission. After determining that the data has been successfully processed, UE 115-*b* may, at 525, identify resources (e.g., time and frequency resources) for sending an ACK to base station 105-*b*. For example, UE 115-*b* may identify a TTI for sending the ACK. The TTI may be selected based on a delay, which in turn may be selected based on the transmission parameters of the downlink data transmission. For example, if the PDSCH conveyed the data in a small transport block, UE 115-*b* may select a short delay for sending the ACK. If the PDSCH conveyed the data in a large transport block, UE 115-*b* may select a long delay for sending the ACK. In some examples the delay may be proportional (e.g., linearly proportional) to the size of the transport block(s) used to convey the data. Thus, the delay may be based on transmission parameters that affect the processing time of the data.

In some cases, UE 115-*b* may select a first delay that is based on one transmission parameter (e.g., non-TB-size dependent delay such as a delay based on the processing capabilities of UE 115-*b*) and a second, TB size dependent delay. In such a scenario, UE 115-*b* may add the first delay and the second delay together to create a new delay, which the UE 115-*b* may use in selecting the TTI for transmitting the ACK. In some cases, UE 115-*b* may select either the first delay or the second delay (e.g., whichever is longer) to use in selecting the TTI from transmitting the ACK.

At 530, UE 115-*b* may send the ACK to base station 105-*b* using the resources selected at 525 (e.g., during the selected TTI). Base station 105-*b* may monitor for, and receive, the ACK at 535. Base station 105-*b* may determine when to monitor for the ACK based on the transmission parameters associated with the downlink data. For example, when the downlink data is conveyed by a small transport block the base station 105-*b* may decide to monitor for the ACK after a short delay (relative to a delay used when the downlink data is conveyed by a comparatively larger transport block). In some cases, base station 105-*b* may monitor for the ACK a number of times (e.g., base station 105-*b* may monitor for the ACK in several different TTIs).

Figure 6:
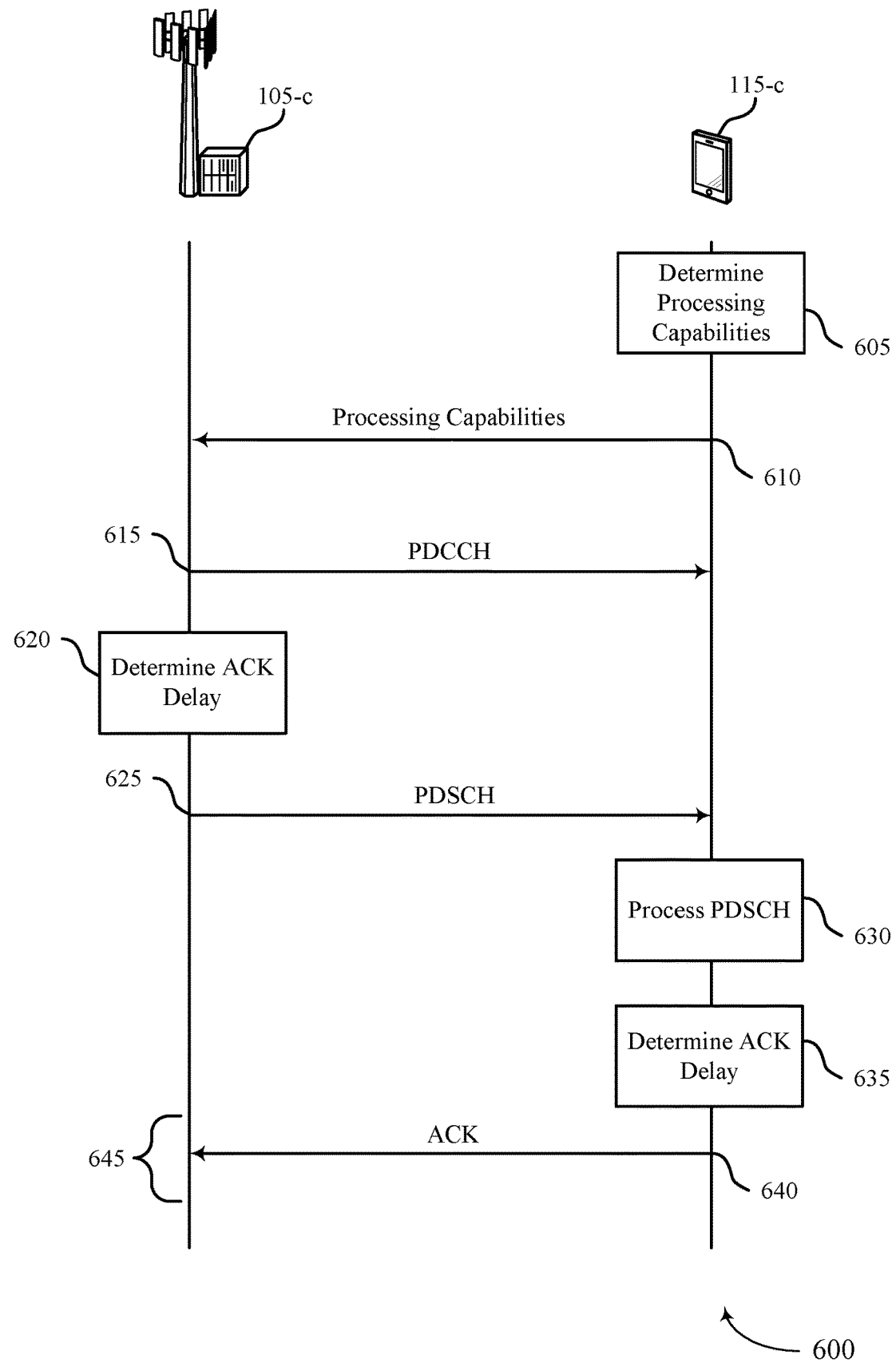
FIG. 6 illustrates an example of a process flow that supports physical shared channel transmission to acknowledgement delay optimization in accordance with aspects of the present disclosure.

FIG. 6 illustrates an example of a process flow 600 that supports physical shared channel transmission to acknowledgement delay optimization in accordance with various aspects of the present disclosure. In some examples, aspects of process flow 600 may be implemented by wireless communications system 100. Process flow 600 may involve base station 105-*c* and UE 115-*c*. In some cases, UE 115-*b* may be an NB-IoT device. Aspects of process flow 600 may be used to select a PDSCH-to-ACK delay that is based on the processing capabilities of UE 115-*c*. Prior to 605, UE 115-*c* may establish a connection with base station 105-*c* and monitor control channels associated with the base station 105-*c*. Although described with reference to PDSCH-to-ACK delay, aspects of process flow 600 may be used for PDSCH-to-NACK delay.

At 605, UE 115-*c* may determine its processing capabilities (e.g., by evaluating its hardware configuration, other processing tasks, and/or battery level to determine its processing capabilities). At 610, UE 115-*c* may transmit an indication of its processing capabilities to base station 105-*c*. In some cases, UE 115-*c* may indicate that it is able to transmit ACK with a delay that is shorter than the default delay for transmitting ACK. In some cases, UE 115-*c* may indicate that it is able to transmit ACK within a delay window (e.g., UE 115-*c* may indicate a maximum delay supported by UE 115-*c*). In some cases, UE 115-*c* may indicate a transport block size dependent processing capability (e.g., UE 115-*c* may indicate that it takes n ms to process x bits of a transport block). In some cases, UE 115-*c* may indicate to base station 105-*c* the delay at which UE 115-*c* will send ACK. In such cases, UE 115-*c* may also indicate whether that delay will be used indefinitely (e.g., until UE 115-*c* changes it and updates base station 105-*c*) or for a number of ACKs.

At 615, base station 105-*c* may send, and UE 115-*c* may receive, a scheduling grant (e.g., PDCCH). The scheduling grant may include the transmission parameters for data conveyed by an upcoming PDSCH. At 620, base station 105-*c* may determine a delay for ACK (e.g., a delay between sending the data and receiving the ACK). Base station 105-*c* may determine the delay based on the processing capabilities indicated by UE 115-*c* and/or the transmission parameters of the data. In some cases, base station 105-*c* may determine a number of TTIs to monitor for the ACK (e.g., based on the determined delay, the processing capabilities of UE 115-*c*, or the transmission parameters of the data). In one example, base station 105-*c* may determine that the downlink transmission will convey the data in y transport block units and that UE 115-*c* can process x transport block units in n ms. Using this information, base station 105-*c* may calculate how long it will take UE 115-*c* to process the downlink transmission and determine the ACK/NACK delay accordingly. At 625, base station 105-*c* may send, and UE 115-*c* may receive, a downlink message conveying data for UE 115-*c* (e.g., PDSCH). At 630, UE 115-*c* may successfully process the downlink message and make a determination to send an ACK.

At 635, UE 115-*c* may determine a delay for transmitting an ACK corresponding to the downlink data transmission. UE 115-*c* may determine the delay based on its processing capabilities and/or based on the transmission parameters of the downlink data transmission. A TTI for the ACK may be selected based on the delay. At 640, UE 115-*c* may transmit the ACK corresponding to the downlink data transmission (e.g., the ACK may be send in the TTI that was selected based on the delay). At 645, base station 105-*c* may monitor for and receive the ACK from UE 115-*c*.

Figure 7:
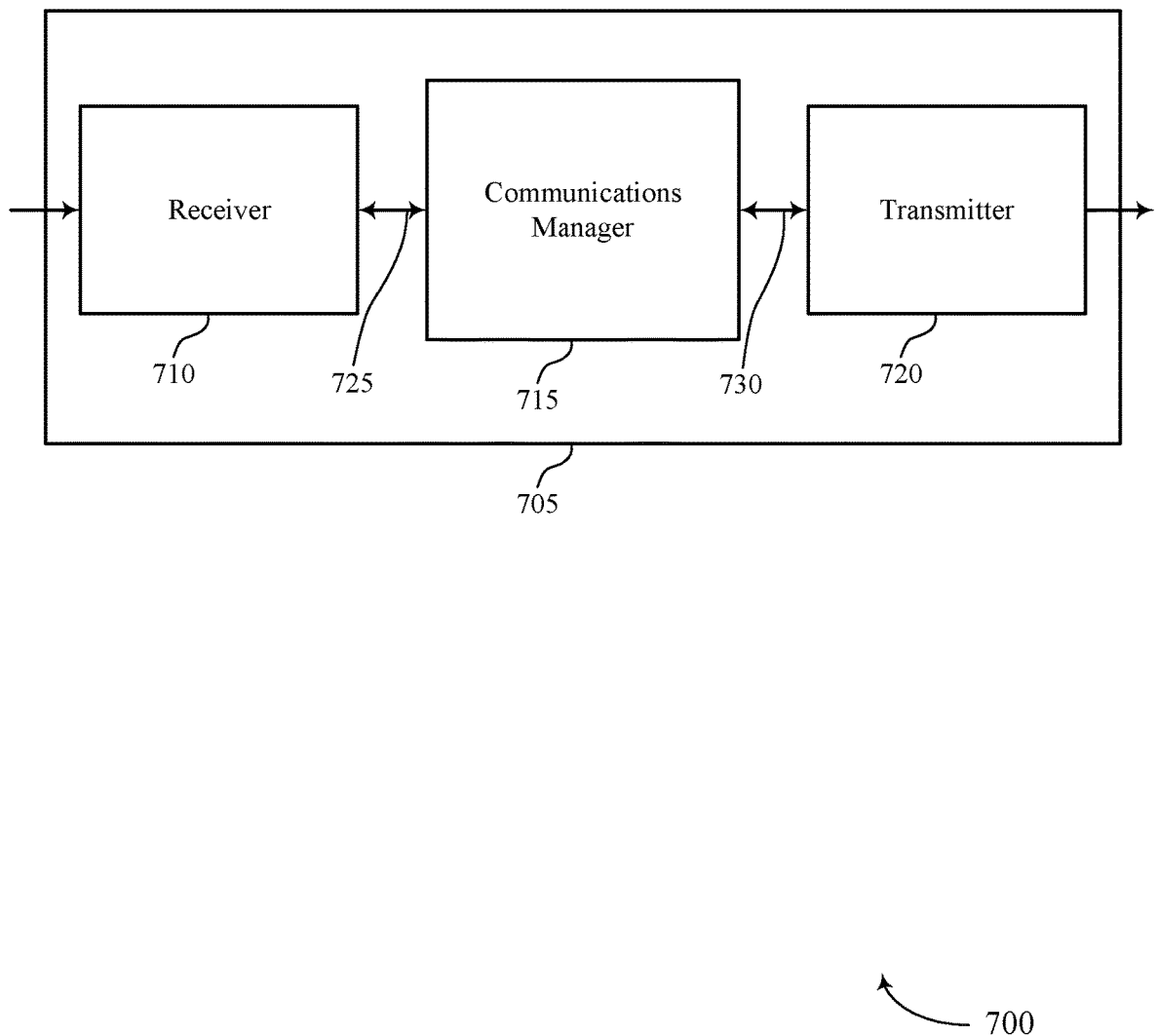
FIG. 7 shows a block diagram of a device that supports physical shared channel transmission to acknowledgement delay optimization in accordance with aspects of the present disclosure.

FIG. 7 shows a block diagram 700 of a wireless device 705 that supports physical shared channel transmission to acknowledgement delay optimization in accordance with aspects of the present disclosure. Wireless device 705 may be an example of aspects of a UE 115 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to physical shared channel transmission to acknowledgement delay optimization, etc.). In some cases, receiver 710 may receive a downlink scheduling grant (e.g., included in a PDCCH transmission from a base station 105) indicating an upcoming downlink data transmission. In some cases, receiver 710 may receive a downlink transmission (e.g., a PDSCH transmission) corresponding to the downlink scheduling grant. The downlink transmission may be received in a first TTI. In some cases, receiver 710 may receive a scheduling grant at the wireless device 705 in a first TTI from a base station 105. Information received by receiver 710 may be passed on to other components of the wireless device 705. For example, receiver 710 may pass a representation of a received signal (e.g., signal representation 725) on to communications manager 715. The receiver 710 may be an example of aspects of the transceiver 935 described with reference to FIG. 9. The receiver 710 may utilize a single antenna or a set of antennas.

Communications manager 715 may receive a downlink scheduling grant (e.g., in a PDCCH transmission) from a base station 105. The downlink scheduling grant may indicate an upcoming downlink transmission from the base station 105 (e.g., the grant may indicate an upcoming PDSCH transmission). Communications manager 715 may receive the downlink transmission from the base station 105 in a first TTI. The downlink transmission may be associated with a transmission mode and may include at least one transport block over at least one transmission layer. Communications manager 715 may identify a second TTI for sending an ACK. The second TTI may be identified based on the transmission parameter(s) associated the data. In some cases, the transmission parameters are associated with the transport block, transmission layer, or transmission mode or the downlink transmission. After the second TTI is identified, communications manager 715 may send an ACK of the received data to the base station 105 during the second TTI.

In some cases, the communications manager 715 may identify a capability of the wireless device 705 to process transmissions. The communications manager 715 may transmit (e.g., to a base station 105), an indication of the wireless device's capability to process transmissions. After transmitting the indication, the communications manager 715 may receive a first physical channel transmission from the base station 105 in a first TTI. The communications manager 715 may communicating a second physical channel transmission with the base station in a second TTI. The second TTI may be determined based on the first TTI and the indicated capability of the wireless device to process transmissions. In some cases, the first physical channel transmission comprises a PDSCH transmission and communicating the second physical channel transmission comprises transmitting an ACK message for the PDSCH transmission. In some cases, the first physical channel transmission comprises a PDCCH transmission and communicating the second physical channel transmission comprises receiving a PDSCH transmission. In some cases, the first physical channel transmission comprises a PDCCH transmission and communicating the second physical channel transmission comprises transmitting a PUSCH transmission.

In some cases, the communications manager 715 may receive a scheduling grant at the wireless device 705 in a TTI. The communications manager 715 may receive the scheduling grant from a base station 105. The scheduling grant may indicate resources for communicating a transmission with the base station 105. The transmission may be transmitted with a certain transmission mode and the transmission may be comprised of one or more transport blocks over one or more transmission layers. The communications manager 715 may identify a second TTI for a transmission. The second TTI may be identified based on the first TTI, and one or more transmission parameters associated with the one or more transport blocks, at least one transmission layer, or the transmission mode. For example, the second TTI may be identified based on an MCS of the at least one transport block, a code rate, a redundancy version, a resource allocation size, a modulation format, a bandwidth, or a number of carriers of the downlink transmission. The communications manager 715 may also communicate the transmission during the second TTI.

Communications manager 715 may pass information on to other components of wireless device 705. For example, communications manager 715 may pass to transmitter 710 an indication 730 of when to send an ACK. Communications manager 715 may be an example of aspects of the communications manager 915 described with reference to FIG. 9.

The communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 720 may transmit signals generated by other components of the device. In some cases, transmitter 720 may transmit an indication of the wireless device's ability to process downlink transmissions. In some cases, transmitter 720 may transmit an ACK to a base station 105. The ACK may be sent in a TTI identified by the wireless device 705.

The TTI may be based on the wireless device's ability to process downlink transmissions. In some cases, transmitter 720 may communicate a transmission during a second TTI. In some cases, transmitter 720 may transmit, to the base station 105, a second indication of the wireless device's 705 capability to process transmissions. The second indication may indicate or reflect a change in the wireless device's 705 capability to process transmissions. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
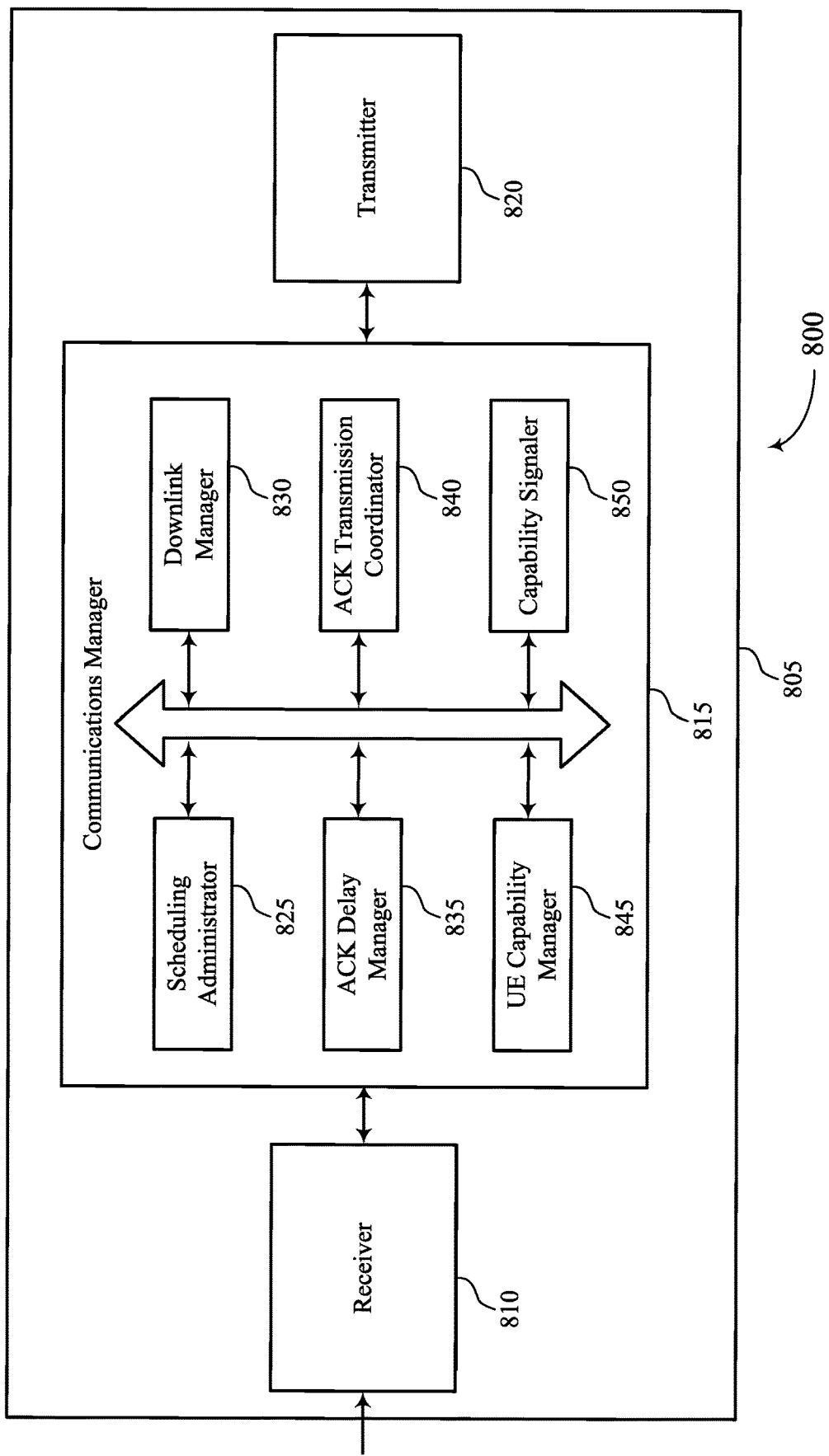
FIG. 8 shows a block diagram of a device that supports physical shared channel transmission to acknowledgement delay optimization in accordance with aspects of the present disclosure.

FIG. 8 shows a block diagram 800 of a wireless device 805 that supports physical shared channel transmission to acknowledgement delay optimization in accordance with aspects of the present disclosure. Wireless device 805 may be an example of aspects of a wireless device 705 or a UE 115 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to physical shared channel transmission to acknowledgement delay optimization, etc.). Information may be passed on to other components of the device. The receiver 810 may be an example of aspects of the transceiver 935 described with reference to FIG. 9. The receiver 810 may utilize a single antenna or a set of antennas.

Communications manager 815 may include scheduling administrator 825, downlink manager 830, ACK delay manager 835, ACK transmission coordinator 840, UE capability manager 845, and capability signaler 850. Communications manager 815 may be an example of aspects of the communications manager 915 described with reference to FIG. 9.

Scheduling administrator 825 may receive a downlink scheduling grant (e.g., a PDCCH transmission) from a base station 105. The downlink scheduling grant may indicate an upcoming downlink transmission (e.g., a PDSCH transmission) from the base station 105. Scheduling administrator 825 may process the grant to determine the resources and transmission parameters of the upcoming downlink transmission. For example, scheduling administrator 825 may identify a code type of the downlink transmission, a repetition level of the downlink transmission, a transport block size of the downlink transmission, a number of transmission layers in the downlink transmission, the transmission mode, an MCS of the at least one transport block, a code rate, a redundancy version, a resource allocation size, a modulation format, a bandwidth, or a number of carriers, of the downlink transmission. In some cases, scheduling administrator 825 may select a delay between a received scheduling grant and a second TTI for a transmission, wherein the second TTI is selected based at least in part on a first TTI and one or more transmission parameters associated with the at least one transport block, the at least one transmission layer, or the transmission mode. For example, the second TTI may be identified based at least in part on an MCS of the at least one transport block, a code rate of the downlink transmission, a redundancy version of the downlink transmission, a resource allocation size, a modulation format, a bandwidth, or a number of carriers of the downlink transmission. Additionally or alternatively, scheduling administrator 825 may select the delay based on PDCCH search space size or number of PDCCH candidates.

Downlink manager 830 may receive downlink data transmissions from a base station 105. For example, downlink manager 830 may receive a downlink transmission from the base station 105 in a first TTI. The downlink transmission may be associated with a transmission mode and may include at least one transport block over at least one transmission layer.

ACK delay manager 835 may identify TTIs for sending ACKs. For example, ACK delay manager 835 may identify a TTI for sending an acknowledgement of data conveyed by the downlink transmission. In some cases, identifying the TTI includes selecting a delay from a table that identifies different delays for different combinations of transmission parameters. In some cases, identifying the second TTI includes identifying a set of TTIs during which the base station will be monitoring for the ACK based on the one or more transmission parameters. In some cases, the TTI is identified based on one or more transmission parameters associated with the downlink transmission (e.g., transport block size, number of transmission layers, transmission mode, etc.). Thus, ACK delay manager 835 may select a delay for sending the ACK based on the transmission parameters of the downlink transmission. In some cases, the selected delay is proportional to the size of the at least one transport block. In some cases, ACK delay manager 835 may select the ACK TTI(s) from a set of TTIs based on a UE capability to process downlink transmissions.

ACK transmission coordinator 840 may coordinate ACK transmissions for wireless device 805. For example, ACK transmission coordinator 840 may send an ACK to the base station 105 during the TTI(s) selected by ACK delay manager 835. UE capability manager 845 may identify the downlink processing capabilities of wireless device 805. For example, UE capability manager 845 may identify the capability of the wireless device 805 to process downlink transmissions. In some cases, UE capability manager 845 may detect or determine a change in the capability of the wireless device 805 to process transmissions. In some cases, UE capability manager 845 may determine an ability by the wireless device 805 to process scheduling grants. In some cases, UE capability manager 845 may identify at least one of a code type, a repetition level, a size of the at least one transport block, a modulation and coding scheme (MCS) of the at least one transport block, a number of transmission layers in the at least one transmission layer, the transmission mode, an MCS of the at least one transport block, a code rate, a redundancy version, a resource allocation size, a modulation format, a bandwidth, or a number of carriers associated with a transmission.

Capability signaler 850 may manage the communication of the wireless device's 805 capabilities. For example, capability signaler 850 may transmit, to a base station 105, an indication of the wireless device's 805 capability to process downlink transmissions. In some cases, the indication of the wireless device's 805 capability to process transmissions indicates that the wireless device 805 is able to transmit the ACK message with a transmission delay that is smaller than a default transmission delay for transmitting ACK messages. In some cases, the indication of the wireless device's 805 capability to process transmissions comprises a maximum ACK delay value supported by the wireless device 805. In some cases, the indication of the wireless device's 805 capability to process transmissions includes a maximum ACK delay value supported by the wireless device 805. In some cases, the indication of the wireless device's 805 capability to process transmissions indicates a processing capability of the wireless device 805 associated with one or more transport block sizes, a processing capability of the wireless device 805 associated with a number of transmission layers, a processing capability of the wireless device 805 associated with one or more transmission modes, or a combination thereof. In some cases, the indication of the wireless device's 805 capability to process transmissions indicates a capability of the wireless device 805 to encode the PUSCH transmission.

Transmitter 820 may transmit signals generated by other components of the device. In some examples, the transmitter 820 may be collocated with a receiver 810 in a transceiver module. For example, the transmitter 820 may be an example of aspects of the transceiver 935 described with reference to FIG. 9. The transmitter 820 may utilize a single antenna or a set of antennas.

Figure 9:
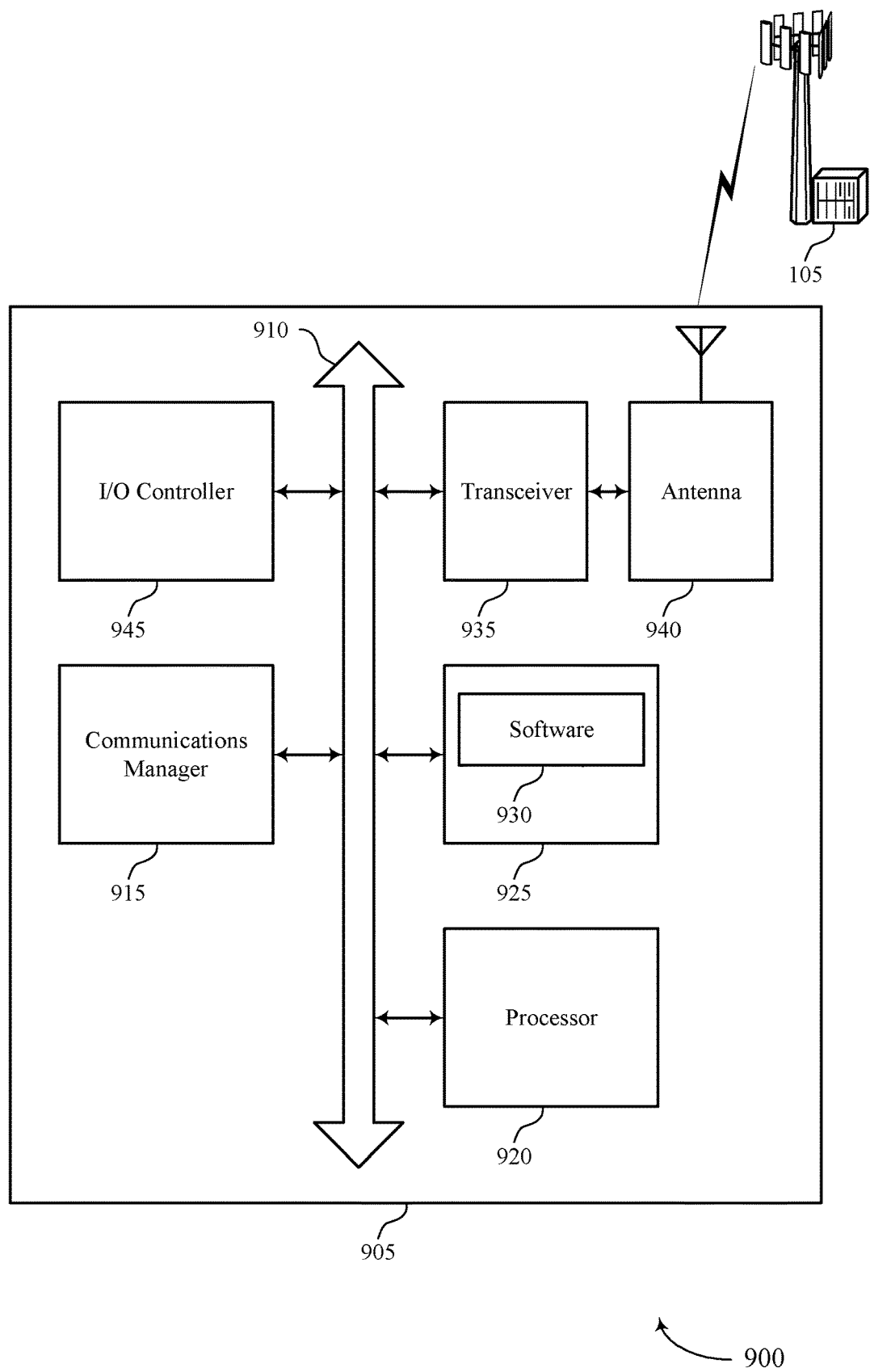
FIG. 9 illustrates a block diagram of a system including a UE that supports physical shared channel transmission to acknowledgement delay optimization in accordance with aspects of the present disclosure.

FIG. 9 shows a diagram of a system 900 including a device 905 that supports physical shared channel transmission to acknowledgement delay optimization in accordance with aspects of the present disclosure. Device 905 may be an example of or include the components of wireless device 705, wireless device 805, or a UE 115 as described above, e.g., with reference to FIGS. 7 and 8. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting physical shared channel transmission to acknowledgement delay optimization).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support physical shared channel transmission to acknowledgement delay optimization. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
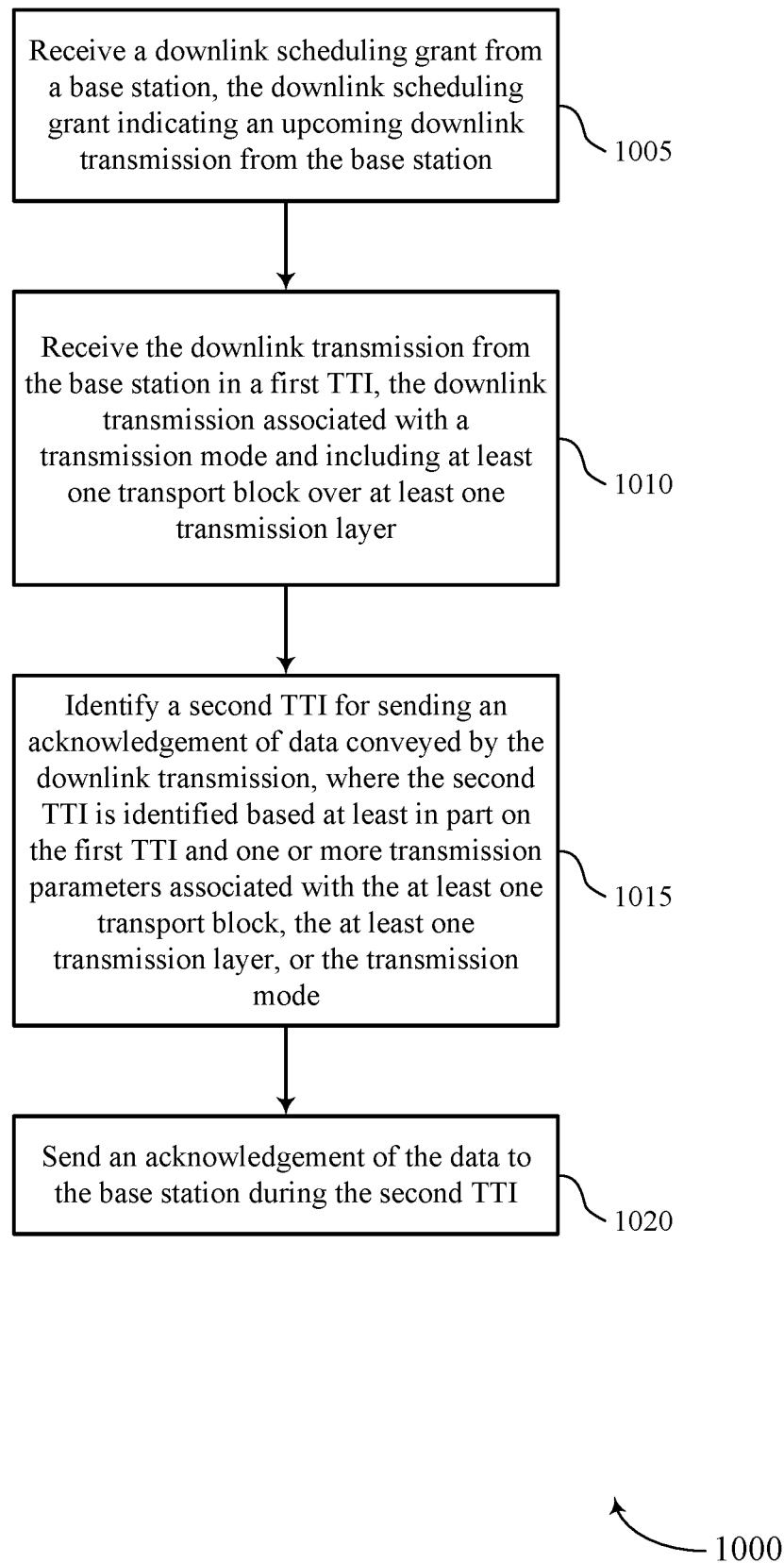
FIGS. 10, 11, and 12 illustrate methods for physical shared channel transmission to acknowledgement delay optimization in accordance with aspects of the present disclosure.

FIG. 10 shows a flowchart illustrating a method 1000 for physical shared channel transmission to acknowledgement delay optimization in accordance with aspects of the present disclosure. The operations of method 1000 may be implemented by a UE 115 or its components as described herein. For example, the operations of method 1000 may be performed by a communications manager as described with reference to FIGS. 7 and 8. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may receive a downlink scheduling grant from a base station. The downlink scheduling grant may indicate an upcoming downlink transmission from the base station. The operations of block 1005 may be performed according to the methods described herein. In certain examples, aspects of the operations of block 1005 may be performed by a scheduling administrator as described with reference to FIG. 8.

At block 1010 the UE 115 may receive the downlink transmission from the base station in a first TTI. The downlink transmission may be associated with a transmission mode and may comprise at least one transport block over at least one transmission layer. The operations of block 1010 may be performed according to the methods described herein. In certain examples, aspects of the operations of block 1010 may be performed by a downlink manager as described with reference to FIG. 8.

At block 1015 the UE 115 may identify a second TTI for sending an acknowledgement of data conveyed by the downlink transmission. The second TTI may be identified based at least in part on the first TTI and one or more transmission parameters associated with the at least one transport block, the at least one transmission layer, or the transmission mode. For example, the second TTI may be identified based at least in part on an MCS of the at least one transport block, a code rate, a redundancy version, a resource allocation size, a modulation format, a bandwidth, or a number of carriers of the downlink transmission. The operations of block 1015 may be performed according to the methods described herein. In certain examples, aspects of the operations of block 1015 may be performed by a ACK delay manager as described with reference to FIG. 8.

At block 1020 the UE 115 may send an acknowledgement of the data to the base station during the second TTI. The operations of block 1020 may be performed according to the methods described herein. In certain examples, aspects of the operations of block 1020 may be performed by a ACK transmission coordinator as described with reference to FIG. 8.

Figure 11:
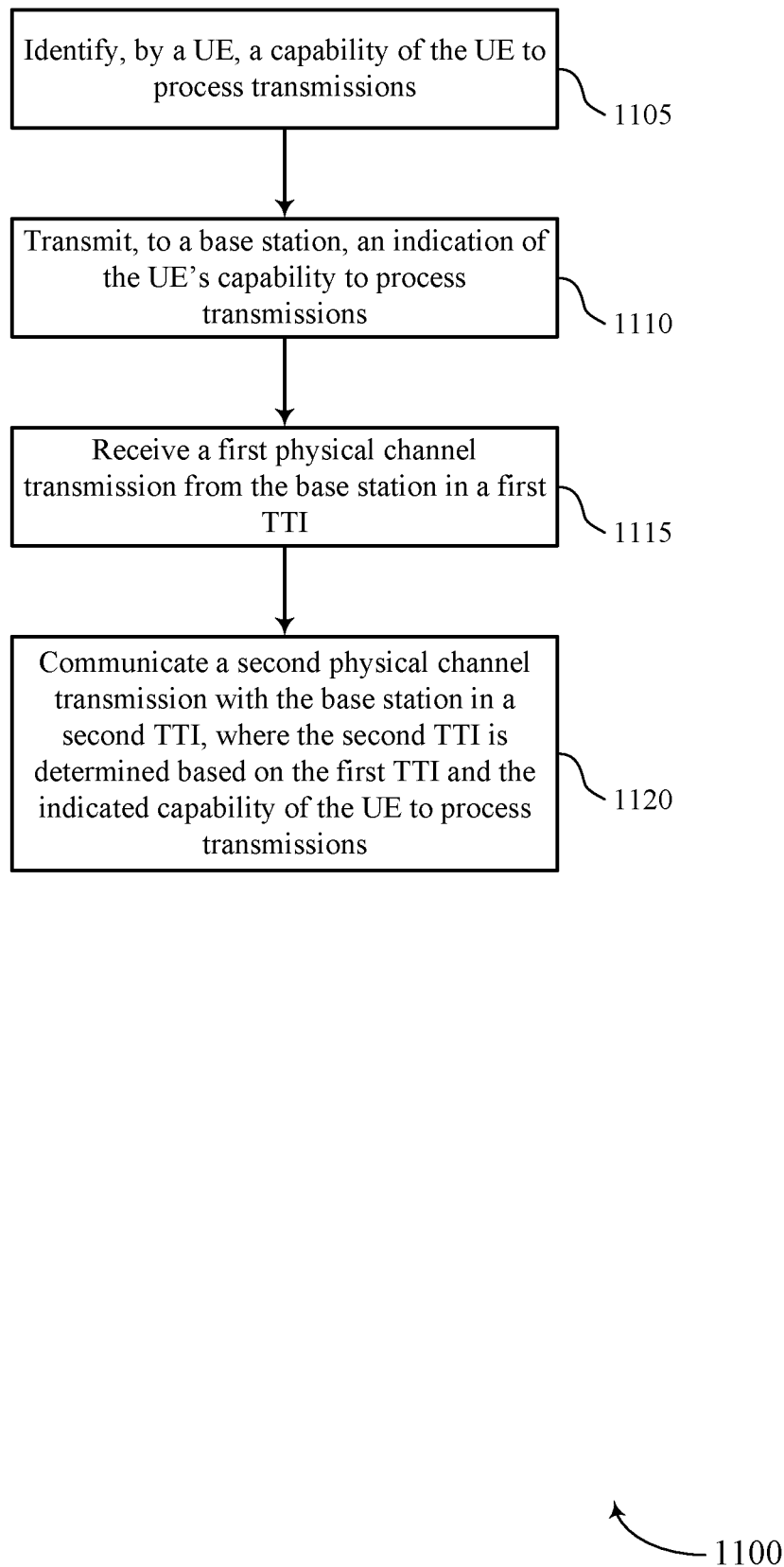

FIG. 11 shows a flowchart illustrating a method 1100 for physical shared channel transmission to acknowledgement delay optimization in accordance with aspects of the present disclosure. The operations of method 1100 may be implemented by a UE 115 or its components as described herein. For example, the operations of method 1100 may be performed by a communications manager as described with reference to FIGS. 7 and 8. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may identify, by a UE, a capability of the UE to process transmissions. The operations of block 1105 may be performed according to the methods described herein. In certain examples, aspects of the operations of block 1105 may be performed by a UE capability manager as described with reference to FIG. 8.

At block 1110 the UE 115 may transmit, to a base station, an indication of the UE's capability to process transmissions. The operations of block 1110 may be performed according to the methods described herein. In certain examples, aspects of the operations of block 1110 may be performed by a capability signaler as described with reference to FIG. 8.

At block 1115 the UE 115 may receive a first physical channel transmission from the base station in a first TTI. The operations of block 1115 may be performed according to the methods described herein. In certain examples, aspects of the operations of block 1115 may be performed by a scheduling administrator as described with reference to FIG. 8.

At block 1120 the UE 115 may communicate a second physical channel transmission with the base station in a second TTI. The second TTI may be determined based on the first TTI and the indicated capability of the UE to process transmissions. The operations of block 1120 may be performed according to the methods described herein. In certain examples, aspects of the operations of block 1120 may be performed by a ACK transmission coordinator as described with reference to FIG. 8.

Figure 12:
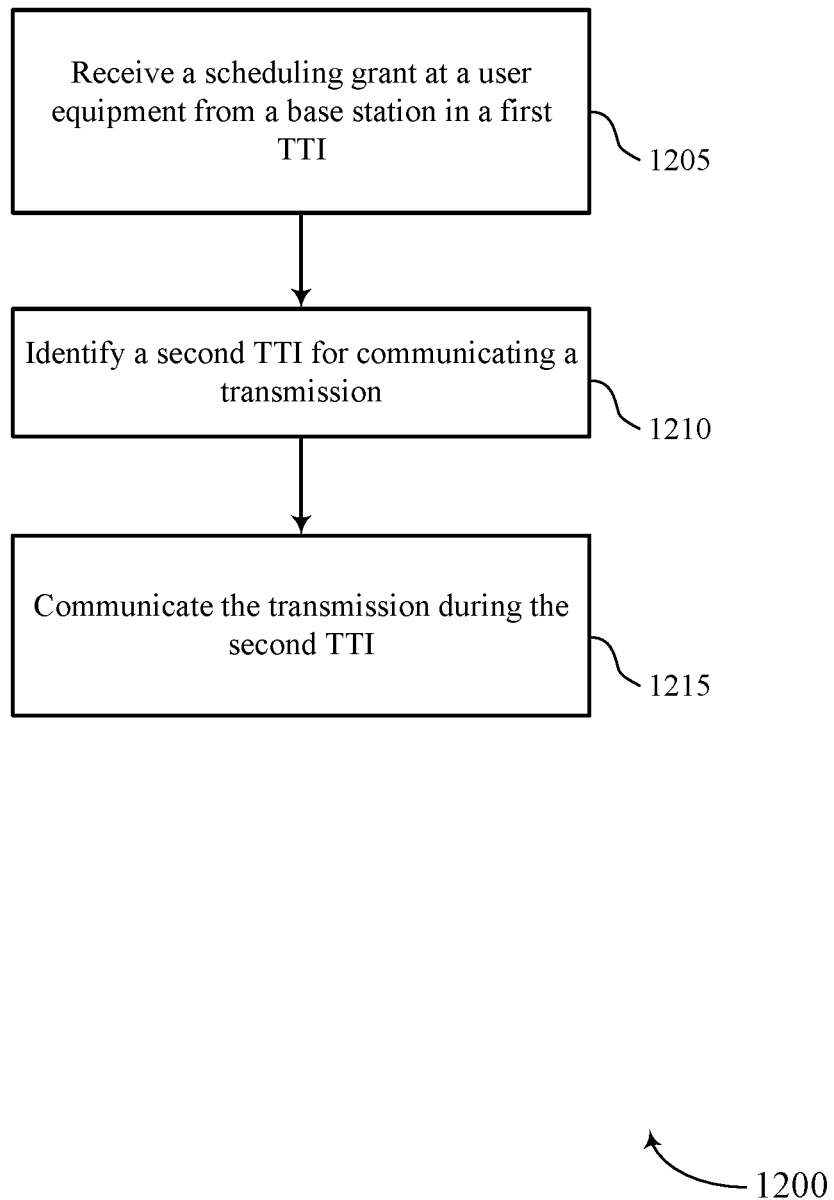

FIG. 12 shows a flowchart illustrating a method 1200 for physical shared channel transmission to acknowledgement delay optimization in accordance with aspects of the present disclosure. The operations of method 1200 may be implemented by a UE 115 or its components as described herein. For example, the operations of method 1200 may be performed by a communications manager as described with reference to FIGS. 7 and 8. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may receive a scheduling grant from a base station in a first TTI. The scheduling grant may indicate resources for communicating a transmission with the base station. The operations of block 1205 may be performed according to the methods described herein. In certain examples, aspects of the operations of block 1205 may be performed by a receiver 710 as described with reference to FIG. 7.

At block 1210 the UE 115 may identify a second TTI for the transmission. The second TTI may be identified based on the first TTI and one or more transmission parameters associated with the a transport block, a transmission layer, or a transmission mode. The operations of block 1210 may be performed according to the methods described herein. In certain examples, aspects of the operations of block 1210 may be performed by a scheduling administrator 825 as described with reference to FIG. 8.

At block 1215 the UE 115 may communicate a transmission during a second TTI. The operations of block 1215 may be performed according to the methods described herein. In certain examples, aspects of the operations of block 1015 may be performed by a transmitter 720 as described with reference to FIG. 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, by a user equipment (UE), a capability of the UE to process transmissions, wherein the capability is associated with a quantity of symbols for the UE to process the transmissions;
   transmitting, to a base station, an indication of the UE's capability to process transmissions;
   receiving a first physical channel transmission from the base station in a first transmission time interval (TTI); and
   communicating a second physical channel transmission with the base station in a second TTI, wherein the second TTI is determined based on the first TTI and the indicated capability of the UE to process transmissions.

2. The method of claim 1, wherein the first physical channel transmission comprises a physical downlink shared channel (PDSCH) transmission and communicating the second physical channel transmission comprises transmitting an acknowledgement (ACK) message for the PDSCH transmission.

3. The method of claim 2, wherein the indication of the UE's capability to process transmissions indicates that the UE is able to transmit the ACK message with a transmission delay that is smaller than a default transmission delay for transmitting ACK messages.

4. The method of claim 2, wherein the indication of the UE's capability to process transmissions comprises a maximum ACK delay value supported by the UE.

5. The method of claim 1, wherein the first physical channel transmission comprises a physical downlink control channel (PDCCH) transmission and communicating the second physical channel transmission comprises receiving a physical downlink shared channel (PDSCH) transmission.

6. The method of claim 1, wherein the indication of the UE's capability to process transmissions indicates a processing capability of the UE associated with one or more transport block sizes, a processing capability of the UE associated with a number of transmission layers, a processing capability of the UE associated with one or more transmission modes, or a combination thereof.

7. The method of claim 1, wherein the first physical channel transmission comprises a physical downlink control channel (PDCCH) transmission and communicating the second physical channel transmission comprises transmitting a physical uplink shared channel (PUSCH) transmission.

8. The method of claim 7, wherein the indication of the UE's capability to process transmissions indicates a capability of the UE to encode the PUSCH transmission.

9. The method of claim 1, further comprising:
   determining a change in the UE's capability to process transmissions; and
   transmitting, to the base station, a second indication of the UE's capability to process transmissions, the second indication reflecting the change in the UE's capability to process transmissions.

10. The method of claim 1, wherein the UE comprises a Narrowband Internet of Things (NB-IoT) device.

11. An apparatus for wireless communication, comprising:
   means for identifying, by a user equipment (UE), a capability of the UE to process transmissions, wherein the capability is associated with a quantity of symbols for the UE to process the transmissions;
   means for transmitting, to a base station, an indication of the UE's capability to process transmissions;
   means for receiving a first physical channel transmission from the base station in a first transmission time interval (TTI); and
   means for communicating a second physical channel transmission with the base station in a second TTI, wherein the second TTI is determined based on the first TTI and the indicated capability of the UE to process transmissions.

12. The apparatus of claim 11, wherein the first physical channel transmission comprises a physical downlink shared channel (PDSCH) transmission and communicating the second physical channel transmission comprises transmitting an acknowledgement (ACK) message for the PDSCH transmission.

13. The apparatus of claim 12, wherein the indication of the UE's capability to process transmissions indicates that the UE is able to transmit the ACK message with a transmission delay that is smaller than a default transmission delay for transmitting ACK messages.

14. The apparatus of claim 12, wherein the indication of the UE's capability to process transmissions comprises a maximum ACK delay value supported by the UE.

15. The apparatus of claim 11, wherein the first physical channel transmission comprises a physical downlink control channel (PDCCH) transmission and communicating the second physical channel transmission comprises receiving a physical downlink shared channel (PDSCH) transmission.

16. The apparatus of claim 11, wherein the indication of the UE's capability to process transmissions indicates a processing capability of the UE associated with one or more transport block sizes, a processing capability of the UE associated with a number of transmission layers, a processing capability of the UE associated with one or more transmission modes, or a combination thereof.

17. The apparatus of claim 11, wherein the first physical channel transmission comprises a physical downlink control channel (PDCCH) transmission and communicating the second physical channel transmission comprises transmitting a physical uplink shared channel (PUSCH) transmission.

18. The apparatus of claim 17, wherein the indication of the UE's capability to process transmissions indicates a capability of the UE to encode the PUSCH transmission.

19. The apparatus of claim 11, further comprising:
means for determining a change in the UE's capability to process transmissions; and
means for transmitting, to the base station, a second indication of the UE's capability to process transmissions, the second indication reflecting the change in the UE's capability to process transmissions.

20. The apparatus of claim 11, wherein the UE comprises a Narrowband Internet of Things (NB-IoT) device or an Machine Type communication (MTC) device.

21. An apparatus for wireless communication, comprising:
a processor;
memory in electronic communication with the processor; and
instructions stored in the memory and operable, when executed by the processor, to cause the apparatus to:
identify, by a user equipment (UE), a capability of the UE to process transmissions, wherein the capability is associated with a quantity of symbols for the UE to process the transmissions;
transmit, to a base station, an indication of the UE's capability to process transmissions;
receive a first physical channel transmission from the base station in a first transmission time interval (TTI); and
communicate a second physical channel transmission with the base station in a second TTI, wherein the second TTI is determined based on the first TTI and the indicated capability of the UE to process transmissions.

22. The apparatus of claim 21, wherein the first physical channel transmission comprises a physical downlink shared channel (PDSCH) transmission and communicating the second physical channel transmission comprises transmitting an acknowledgement (ACK) message for the PDSCH transmission.

23. The apparatus of claim 22, wherein the indication of the UE's capability to process transmissions indicates that the UE is able to transmit the ACK message with a transmission delay that is smaller than a default transmission delay for transmitting ACK messages.

24. The apparatus of claim 22, wherein the indication of the UE's capability to process transmissions comprises a maximum ACK delay value supported by the UE.

25. The apparatus of claim 21, wherein the first physical channel transmission comprises a physical downlink control channel (PDCCH) transmission and communicating the second physical channel transmission comprises receiving a physical downlink shared channel (PDSCH) transmission.

26. The apparatus of claim 21, wherein the indication of the UE's capability to process transmissions indicates a processing capability of the UE associated with one or more transport block sizes, a processing capability of the UE associated with a number of transmission layers, a processing capability of the UE associated with one or more transmission modes, or a combination thereof.

27. The apparatus of claim 21, wherein the first physical channel transmission comprises a physical downlink control channel (PDCCH) transmission and communicating the second physical channel transmission comprises transmitting a physical uplink shared channel (PUSCH) transmission.

28. The apparatus of claim 27, wherein the indication of the UE's capability to process transmissions indicates a capability of the UE to encode the PUSCH transmission.

29. The apparatus of claim 21, wherein the instructions are further executable by the processor to:
determine a change in the UE's capability to process transmissions; and
transmit, to the base station, a second indication of the UE's capability to process transmissions, the second indication reflecting the change in the UE's capability to process transmissions.

30. The apparatus of claim 21, wherein the UE comprises a Narrowband Internet of Things (NB-IoT) device or a Machine Type communication (MTC) device.

31. A non-transitory computer readable medium storing code for wireless communication, the code comprising instructions executable by a processor to:
identify, by a user equipment (UE), a capability of the UE to process transmissions, wherein the capability is associated with a quantity of symbols for the UE to process the transmissions;
transmit, to a base station, an indication of the UE's capability to process transmissions;
receive a first physical channel transmission from the base station in a first transmission time interval (TTI); and
communicate a second physical channel transmission with the base station in a second TTI, wherein the second TTI is determined based on the first TTI and the indicated capability of the UE to process transmissions.

32. The non-transitory computer readable medium of claim 31, wherein the first physical channel transmission comprises a physical downlink shared channel (PDSCH) transmission and communicating the second physical channel transmission comprises transmitting an acknowledgement (ACK) message for the PDSCH transmission.

33. The non-transitory computer readable medium of claim 32, wherein the indication of the UE's capability to process transmissions indicates that the UE is able to transmit the ACK message with a transmission delay that is smaller than a default transmission delay for transmitting ACK messages.

34. The non-transitory computer readable medium of claim 32, wherein the indication of the UE's capability to process transmissions comprises a maximum ACK delay value supported by the UE.

35. The non-transitory computer readable medium of claim 31, wherein the first physical channel transmission comprises a physical downlink control channel (PDCCH) transmission and communicating the second physical channel transmission comprises receiving a physical downlink shared channel (PDSCH) transmission.

36. The non-transitory computer readable medium of claim 31, wherein the indication of the UE's capability to process transmissions indicates a processing capability of the UE associated with one or more transport block sizes, a processing capability of the UE associated with a number of transmission layers, a processing capability of the UE associated with one or more transmission modes, or a combination thereof.

37. The non-transitory computer readable medium of claim 31, wherein the first physical channel transmission comprises a physical downlink control channel (PDCCH) transmission and communicating the second physical channel transmission comprises transmitting a physical uplink shared channel (PUSCH) transmission.

38. The non-transitory computer readable medium of claim 37, wherein the indication of the UE's capability to process transmissions indicates a capability of the UE to encode the PUSCH transmission.

39. The non-transitory computer readable medium of claim 31, wherein the instructions are further executable by the processor to:
   determine a change in the UE's capability to process transmissions; and
   transmit, to the base station, a second indication of the UE's capability to process transmissions, the second indication reflecting the change in the UE's capability to process transmissions.

40. The non-transitory computer readable medium of claim 31, wherein the UE comprises a Narrowband Internet of Things (NB-IoT) device or a Machine Type communication (MTC) device.

\* \* \* \* \*